(12) United States Patent
Decarreau et al.

(10) Patent No.: US 11,997,722 B2
(45) Date of Patent: May 28, 2024

(54) RANDOM ACCESS PROCEDURE REPORTING AND IMPROVEMENT FOR WIRELESS NETWORKS

(71) Applicant: NOKIA TECHNOLOGIES OY, Espoo (FI)

(72) Inventors: Guillaume Decarreau, Munich (DE); Anna Pantelidou, Massy (FR)

(73) Assignee: Nokia Technologies Oy, Espoo (FI)

( * ) Notice: Subject to any disclaimer, the term of this patent is extended or adjusted under 35 U.S.C. 154(b) by 375 days.

(21) Appl. No.: 17/595,354

(22) PCT Filed: May 23, 2019

(86) PCT No.: PCT/FI2019/050398
§ 371 (c)(1),
(2) Date: Nov. 15, 2021

(87) PCT Pub. No.: WO2020/234507
PCT Pub. Date: Nov. 26, 2020

(65) Prior Publication Data
US 2022/0217781 A1    Jul. 7, 2022

(51) Int. Cl.
*H04W 74/0833*    (2024.01)
(52) U.S. Cl.
CPC ................. *H04W 74/0833* (2013.01)
(58) Field of Classification Search
CPC .................................................. H04W 74/0833
See application file for complete search history.

(56) References Cited

U.S. PATENT DOCUMENTS

| | | |
|---|---|---|
| 9,491,780 B2 | 11/2016 | Pang et al. |
| 2010/0331031 A1 | 12/2010 | Chen |
| 2013/0265942 A1 | 10/2013 | Lu et al. |
| 2014/0241285 A1 | 8/2014 | Pang et al. |
| 2019/0028905 A1 | 1/2019 | Veeramallu et al. |

FOREIGN PATENT DOCUMENTS

| | | |
|---|---|---|
| WO | 2010107358 A1 | 9/2010 |
| WO | 2018204863 A1 | 11/2018 |

OTHER PUBLICATIONS

International Search Report and Written Opinion for International Application No. PCT/FI2019/050398, dated Oct. 10, 2021, 12 pages.
3GPP TS 38.300, V0.2.0; "3rd Generation Partnership Project; Technical Specification Group Radio Access Network; NG Radio Access Network; Overall Description; Stage 2 (Release 15)"; May 2017, 33 pages.
European Search Report for Application No. 19929940.5, dated Feb. 15, 2023, 11 pages.

*Primary Examiner* — Natasha W Cosme
(74) *Attorney, Agent, or Firm* — Brake Hughes Bellermann LLP

(57) ABSTRACT

According to an example embodiment, a method may include logging, by a user equipment, random access procedure information for one or more random access procedures of the user equipment; controlling receiving, by the user equipment from a base station, an information request including an indication of one or more random access procedure trigger types for which random access procedure information is being requested; and controlling sending, by the user equipment to the base station, a random access procedure report including the random access procedure information for the one or more indicated random access procedure trigger types.

19 Claims, 17 Drawing Sheets

US 11,997,722 B2

RANDOM ACCESS PROCEDURE REPORTING AND IMPROVEMENT FOR WIRELESS NETWORKS

CROSS-REFERENCE TO RELATED APPLICATIONS

This application is a national stage entry of International Application No. PCT/FI2019/050398, filed May 23, 2019, entitled "RANDOM ACCESS PROCEDURE REPORTING AND IMPROVEMENT FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: logging, by a user equipment, random access procedure information for one or more random access procedures of the user equipment; controlling receiving, by the user equipment from a base station, an information request including an indication of one or more random access procedure trigger types for which random access procedure information is being requested; and controlling sending, by the user equipment to the base station, a random access procedure report including the random access procedure information for the one or more indicated random access procedure trigger types.

According to an example embodiment, an apparatus may include means for logging, by a user equipment, random access procedure information for one or more random access procedures of the user equipment; means for controlling receiving, by the user equipment from a base station, an information request including an indication of one or more random access procedure trigger types for which random access procedure information is being requested; and means for controlling sending, by the user equipment to the base station, a random access procedure report including the random access procedure information for the one or more indicated random access procedure trigger types.

According to an example embodiment, an apparatus may include: at least one processor; and at least one memory including computer program code; the at least one memory and the computer program code configured to, with the at least one processor, cause the apparatus at least to: log (or store), by a user equipment, random access procedure information for one or more random access procedures of the user equipment; control receiving, by the user equipment from a base station, an information request including an indication of one or more random access procedure trigger types for which random access procedure information is being requested; and control sending, by the user equipment to the base station, a random access procedure report including the random access procedure information for the one or more indicated random access procedure trigger types.

According to an example embodiment, a non-transitory computer-readable storage medium comprising instructions stored thereon that, when executed by at least one processor, are configured to cause a computing system to perform a method of: logging, by a user equipment, random access procedure information for one or more random access procedures of the user equipment; controlling receiving, by the user equipment from a base station, an information request including an indication of one or more random access procedure trigger types for which random access procedure information is being requested; and controlling sending, by the user equipment to the base station, a random access procedure report including the random access procedure information for the one or more indicated random access procedure trigger types.

According to an example embodiment, a method may include: controlling sending, by a base station to a user equipment, an information request for random access procedure information for one or more random access procedures of the user equipment, the information request including an indication of one or more random access procedure trigger types for which random access procedure information is being requested; and controlling receiving, by the base station from the user equipment, a random access procedure report including the random access procedure information for the one or more indicated random access procedure trigger types.

According to an example embodiment, an apparatus may include means for controlling sending, by a base station to a user equipment, an information request for random access procedure information for one or more random access procedures of the user equipment, the information request including an indication of one or more random access procedure trigger types for which random access procedure information is being requested; and means for controlling receiving, by the base station from the user equipment, a random access procedure report including the random access procedure information for the one or more indicated random access procedure trigger types.

According to an example embodiment, an apparatus may include: at least one processor; and at least one memory including computer program code; the at least one memory and the computer program code configured to, with the at least one processor, cause the apparatus at least to: control sending, by a base station to a user equipment, an information request for random access procedure information for one or more random access procedures of the user equipment, the information request including an indication of one or more random access procedure trigger types for which random access procedure information is being requested; and control receiving, by the base station from the user equipment, a random access procedure report including the random access procedure information for the one or more indicated random access procedure trigger types.

According to an example embodiment, a non-transitory computer-readable storage medium comprising instructions stored thereon that, when executed by at least one processor, are configured to cause a computing system to perform a method of: controlling sending, by a base station to a user equipment, an information request for random access procedure information for one or more random access procedures of the user equipment, the information request including an indication of one or more random access procedure trigger types for which random access procedure information is being requested; and controlling receiving, by the base station from the user equipment, a random access procedure report including the random access procedure information for the one or more indicated random access procedure trigger types.

According to an example embodiment, a method may include: controlling sending, by a coordinator for random access procedure optimization to a trigger-specific machine learning submodule for one or more random access procedure trigger types, a request for a trigger type-specific random access procedure cost; controlling receiving, by the coordinator from the machine learning submodule for one or more random access procedure trigger types, cost information including the trigger type-specific random access procedure cost for one or more random access procedure trigger types; and adjusting, by the coordinator, based on the cost information, one or more random access procedure parameters or allocation of resources, for at least one of the plurality of random access procedure trigger types.

According to an example embodiment, an apparatus may include means for controlling sending, by a coordinator for random access procedure optimization to a trigger-specific machine learning submodule for one or more random access procedure trigger types, a request for a trigger type-specific random access procedure cost; means for controlling receiving, by the coordinator from the machine learning submodule for one or more random access procedure trigger types, cost information including the trigger type-specific random access procedure cost for one or more random access procedure trigger types; and means for adjusting, by the coordinator, based on the cost information, one or more random access procedure parameters or allocation of resources, for at least one of the plurality of random access procedure trigger types.

According to an example embodiment, an apparatus may include: at least one processor; and at least one memory including computer program code; the at least one memory and the computer program code configured to, with the at least one processor, cause the apparatus at least to: control sending, by a coordinator for random access procedure optimization to a trigger-specific machine learning submodule for one or more random access procedure trigger types, a request for a trigger type-specific random access procedure cost; control receiving, by the coordinator from the machine learning submodule for one or more random access procedure trigger types, cost information including the trigger type-specific random access procedure cost for one or more random access procedure trigger types; and adjust, by the coordinator, based on the cost information, one or more random access procedure parameters or allocation of resources, for at least one of the plurality of random access procedure trigger types.

According to an example embodiment, a non-transitory computer-readable storage medium comprising instructions stored thereon that, when executed by at least one processor, are configured to cause a computing system to perform a method of: controlling sending, by a coordinator for random access procedure optimization to a trigger-specific machine learning submodule for one or more random access procedure trigger types, a request for a trigger type-specific random access procedure cost; controlling receiving, by the coordinator from the machine learning submodule for one or more random access procedure trigger types, cost information including the trigger type-specific random access procedure cost for one or more random access procedure trigger types; and adjusting, by the coordinator, based on the cost information, one or more random access procedure parameters or allocation of resources, for at least one of the plurality of random access procedure trigger types.

The details of one or more examples of embodiments are set forth in the accompanying drawings and the description below. Other features will be apparent from the description and drawings, and from the claims.

DETAILED DESCRIPTION

Figure 1:
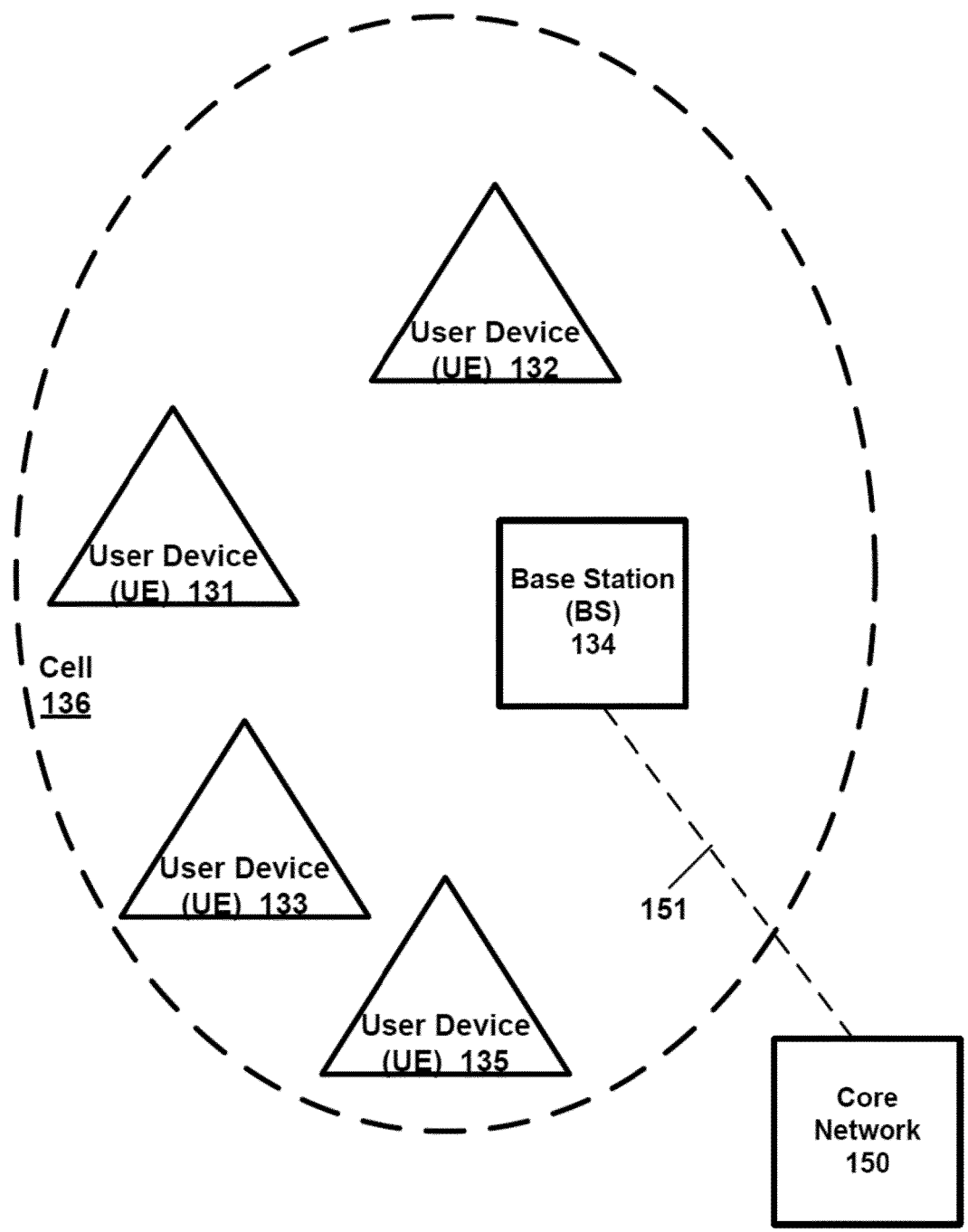
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a SI interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

According to an example embodiment, a Random Access (RACH) Procedure may be performed by a UE for a variety of reasons (or triggers). For example, a UE may use a RACH procedure to establish a connection with a BS (e.g., eNB, gNB). RACH procedures may have the possibility of failure, e.g., due to collisions or other reasons.

Figure 2:
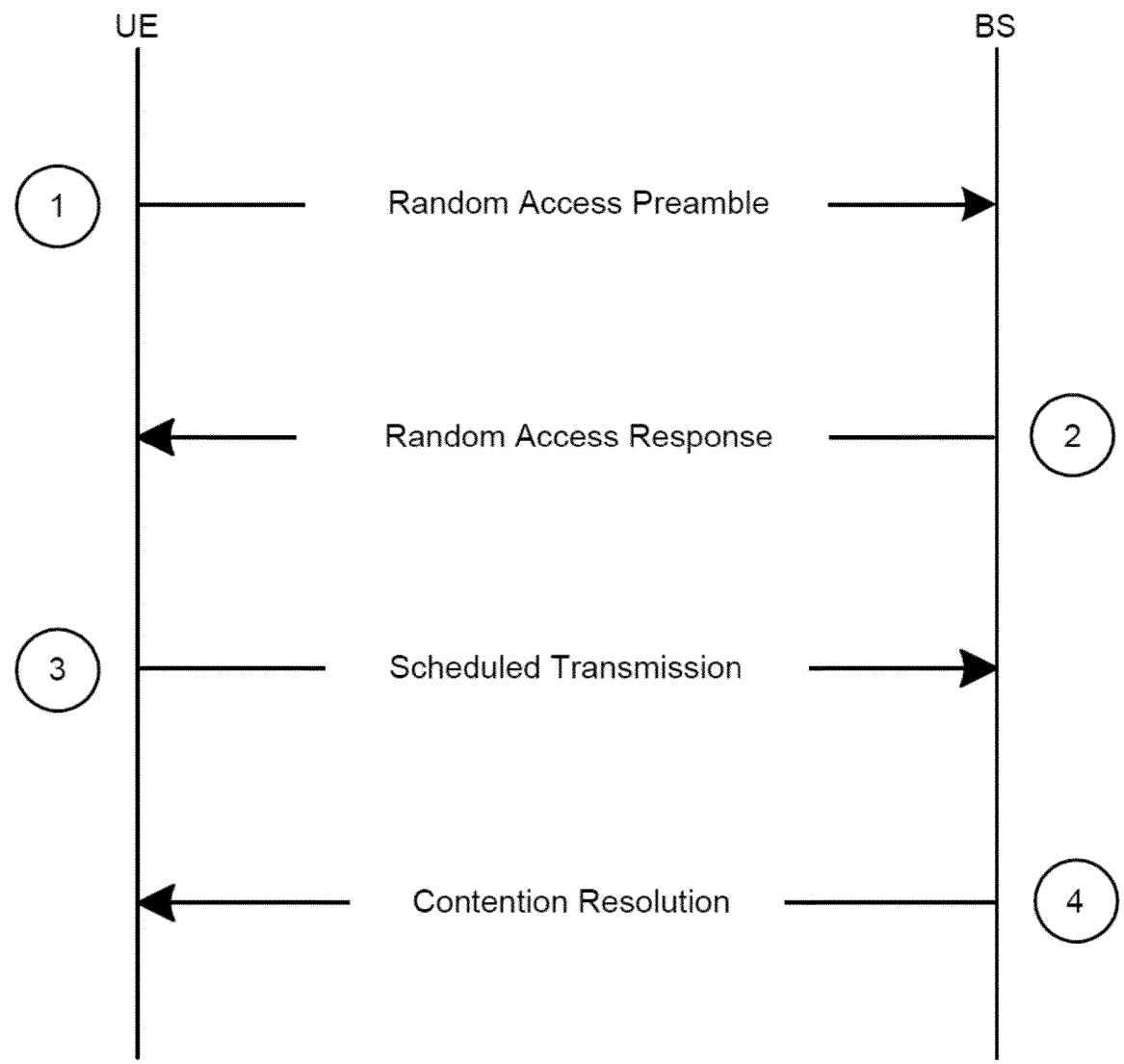
FIG. 2 is a diagram illustrating operations of a random access (RACH) procedure according to an example embodiment.

FIG. 2 (3GPP 38.300) is a diagram illustrating operations of a 4-step random access (RACH) procedure. When the RACH procedure is triggered (caused to be performed by the UE), the UE sends a random access preamble over the RACH (Step 1). There are different groups of preambles defined, depending on the size of MSG (message) 3 and of the UE's channel conditions. The UE obtains information on how to access the channel from system information block 1 (SIB1) broadcasted in the BS system information (SI). In Step 2, the network (BS), upon reception of a preamble (if there are no collisions with other UEs), responds with a random access response (RAR). The UE must monitor the physical downlink control channel (PDCCH) channel identified by an RA-RNTI (random access-radio network temporary identifier assigned to the UE) during a window that starts at the subframe containing the end of the preamble transmission. Upon receiving the RAR message, the UE can send the first uplink transmission to the network (MSG 3). The size of the transmission depends on the grant received at step 2 (MSG 2). Step 4 involves the contention resolution phase.

According to an example embodiment, the RACH procedure involves several parameters which are given to the UE by the network (or BS). Such parameters include (among others) the RACH (or PRACH) configuration index (which may identify a RACH preamble format, a subframe number, a slot number, a starting symbol, etc., and thus specifies the available set of PRACH occasions), the initial random access preamble power, the power ramping step in case of RACH failure, the scaling factor for prioritized random access procedure, the random access (RACH) preamble index, the thresholds for selecting synchronization signal blocks (SSBs) and channel state information reference signals (CSI-RS), associated with beams to be used (e.g., which may be useful especially during beam failure recovery procedures) as well as a reference signal received power (RSRP) threshold to select between the Supplementary Uplink Carrier versus the Normal Uplink Carrier. Those example RACH parameters may be given to the UE through system information (SIB1).

According to an example embodiment, it may be desirable to improve RACH performance RACH performance may be improved, e.g., by the BS using a RACH optimization procedure to select a set of RACH parameters to be used for RACH procedures, wherein the set of RACH parameters, for example, may be selected or designed to reduce a number of RACH failures and/or to decrease a number of RACH preamble transmissions (e.g., on average) required to achieve RACH procedure success (e.g., for one or more RACH trigger types). Some example RACH parameters that may be set or adjusted via a RACH optimization process may include, e.g., a RACH configuration (resource unit allocation), a RACH preamble split (among dedicated, group A, group B), a RACH backoff parameter value, RACH transmission power control parameters, and/or other RACH related parameters. Currently, when a UE is configured by the network to report RACH information, it reports very limited information regarding the RACH procedure, such as the number of preambles sent by the MAC (media access control layer) for the last successfully completed RACH procedure, and an indication of whether contention resolution failed for any of the RACH preambles transmitted for the last successfully completed RACH procedure. This very limited information does not allow for significant RACH optimization.

In addition, a RACH procedure may be triggered (or caused to be performed) by a number of events or RACH trigger types, such as, for example: Initial access from RRC_IDLE; RRC Connection Re-establishment procedure; Handover; DL (downlink) or UL (uplink) data arrival during RRC (radio resource control) CONNECTED when UL synchronization status is "non-synchronized"; UL data arrival during RRC_CONNECTED when there are no PUCCH (physical uplink control channel) resources for SR (scheduling request) available; SR (scheduling request) failure; Request by RRC upon synchronous reconfiguration; Transition from RRC_INACTIVE; establishment of time alignment at SCell (secondary cell) addition; Request for Other system information (SI); Beam failure recovery, with potentially new triggers introduced in future releases. Therefore, it is evident that there may be many different causes or trigger types for a RACH procedure. Thus, a RACH trigger type may be (or may include) a reason or cause for the UE to perform a random access (RACH) procedure.

As an example, RACH can be triggered by a UE to request On Demand SI. In this case, a UE in RRC_IDLE and RRC_INACTIVE can request Other SI (case 10) by triggering a random access procedure in which either: a) MSG3 includes the SI request message or b) the requested SI is associated with a subset of RACH resources in which case MSG1 indicates the requested other SI. These 2 different mechanisms to request SI can have different success outcomes. Merely reporting a number of RACH preambles of the last successful RACH procedure may thus omit RACH information for many other (successful and unsuccessful) RACH procedures. Moreover, such limited RACH report does not indicate the trigger or cause for such last successful RACH procedure. If UE reports to the network separately information regarding the success of the SI request procedure, the network can further optimize the RACH parameters and/or RACH resources to send requests for Other SI.

This is merely an illustrative example for further RACH optimization that may be performed if additional information is provided.

Furthermore, for the case 10 above (Request for Other SI), the UE will perform the RACH to request the system information blocks (SIBs) and then perform another RACH for the connection to the network. If UE stores only one (the last) RACH Report, this will be overwritten by the RACH procedure performed when UE sent the RRC Connection Request. If UE makes subsequent On Demand SI request (without RRC Connection Request), only the latest RACH information is currently stored. The network would not have access to the previous RACH information for previous RACH procedures (thus, preventing significant RACH optimization).

As another illustrative example, for the case 11, a similar problem arises in that the beam failure recovery procedure can happen quite often and after the UE performs RACH procedure for RRC Connection and the RACH Report is sent to the network. Also, since it can happen often, only the RACH information for the last RACH procedure is provided to the BS/network.

Presently, this limited RACH information that the UE reports, including the number of preambles transmitted until successful RACH procedure as well as the number of contention resolution failures, is insufficient to enable significant RACH optimization.

Various example embodiments relate to random access (RACH) procedure optimization involving the improvement of a RACH procedure(s). For example RACH optimization (or RACH improvement) may include performing one or more adjustments or changes (e.g., changing or adjusting one or more RACH parameters) in order to improve operation of a random access (RACH) procedure(s)). Thus, according to an example embodiment, a RACH optimization procedure (or RACH optimization process) may be provided in which one or more RACH parameters and/or RACH resource allocations may be adjusted to improve operation of a random access (RACH) procedure. For example, to improve or optimize operation of a RACH procedure(s), the RACH optimization process may select or adjust one or more RACH parameters and/or allocation of resources (e.g., which may include RACH resources) to reduce a cost (e.g., to reduce an average number of RACH preamble transmissions required for a successful RACH procedure for the RACH trigger type) for one or more RACH trigger types. Thus, for example, the RACH optimization procedure may attempt to reduce the number of RACH failures and/or RACH preamble transmissions required for one or more RACH trigger types. Thus, for example, the RACH optimization procedure may adjust RACH parameters and/or adjust allocation of resources to increase successful RACH procedures for one or more (e.g., priority) RACH trigger types (or decrease a cost of one or more trigger types). For example, the BS may adjust one or more RACH parameters or adjust allocation of resources (e.g., RACH resources, such as slots, RACH occasions, beams, RACH preambles, number of RACH preambles allocated to the trigger type, a length of a RACH preamble, . . . ) (e.g., for one or more RACH trigger types), based on one or more of: 1) RACH information collected by the BS, 2) UE RACH reports (including RACH information for one or more RACH trigger types) received from UE, and/or 3) RACH information received by the BS from one or more other BSs (including RACH information for one or more RACH trigger types), e.g., via the Xn (BS-to-BS) interface.

According to an example embodiment, the RACH optimization (or random access procedure improvement) procedure (or process) may be implemented via a machine learning (ML) algorithm. A ML algorithm may be, for example, a computer implemented algorithm or logic (which may be hardware and/or software) in which a model (e.g., a computational model) is built or generated based on sample data, known as "training data", in order to make predictions or decisions (e.g., to adjust RACH parameters to reduce RACH costs, as an illustrative example). Thus, for example, a machine learning (ML) algorithm may be used for RACH optimization (RACH improvement). A ML algorithm may also be referred to as an artificial intelligence (AI) neural network, a neural network model, an AI neural network model, an AI model, etc.

According to an example embodiment, a ML algorithm or neural network may include a model, such as a computational model made up of nodes organized in layers. The nodes may also referred to as artificial neurons, or simply neurons, and perform a function on provided input to produce some output value. A neural network may require a training period to learn the parameters, e.g., weights, used to map the input to a desired output. The mapping occurs via the function. The weights may be used for the mapping function of the neural network. Each AI (or neural network) model may be trained for a specific task (e.g., such as for RACH optimization, or for determining a trigger-specific RACH cost).

Also, according to an example embodiment, a trigger-specific machine learning (ML) submodule may be provided for each (or one or more) of multiple RACH trigger types. According to an example embodiment, a trigger-specific ML submodule may be or may include a computer implemented algorithm or logic (which may be hardware and/or software), which includes a machine learning (ML) algorithm (e.g., a computational mode, a neural network, a neural network model, an AI neural network) to assist in performing a task or function (e.g., to determine a trigger-specific RACH cost or other function) specific for a particular RACH trigger type. Thus, a trigger-specific ML submodule is provided to perform a specific function or task for a particular RACH trigger type(s). Each ML submodule may, for example, determine a RACH cost for a RACH trigger type. For example, based on the costs of a plurality of RACH trigger types, RACH parameters and/or resource allocation may be adjusted.

Thus, for example, a new (e.g., extended) set of RACH reporting parameters may be used by UEs to send extended RACH reports to a BS, e.g., for the purpose of RACH optimization. An extended RACH report may include a report of RACH parameters and/or RACH events that includes information relating to more RACH parameters and/or more RACH procedures than a normal or standard RACH report. Thus, an extended RACH report may be more appropriate (or useful) for RACH optimization, as compared to a more limited normal RACH report. The set of new RACH parameters for an extended RACH report may take into account the new NR (New Radio or 5G) elements, such as multiple possible RACH triggers that can initiate the RACH process as well as the new physical layer elements that NR introduces e.g., in terms of using multiple beams and user specific bandwidth parts (BWPs), for example. For example, a BWP may include a frequency spectrum or a portion of bandwidth that may be used for transmission or reception of signals, Furthermore, as further information upon which RACH optimization may be based, RACH information may be received from one or more other BSs via Xn (BS-to-BS) interface. A UE may indicate availability of RACH information. Also a BS may indicate a RACH logging time indication that indicates a time the UE should log (store) RACH information. Also, logging of RACH information may be triggered or initiated based on location information (e.g., UE RACH logging may be initiated when a UE is within a certain cell, a certain tracking area, or a RAN notification area, or when signal power of received reference signals is greater than a threshold or less than a threshold, or when a UE has a specific GPS (global positioning system) coordinate(s)). Thus, for example, timing and/or location may be used to cause the UE to log RACH information. The UE may also send to the BS a RACH information availability indicator that indicates that RACH information has been stored (logged) and is available for the BS.

Also, the UE RACH reports may be used together with the Xn (BS-to-BS) exchanged RACH information as inputs to an ML algorithm that will perform the RACH optimization. The ML algorithm may, for example, be located at a BS, a CU, a DU, and/or at an external entity. For example, one illustrative goal or target of the ML algorithm may be to minimize the number of RACH failures. By receiving the UE RACH reports (as well as the surrounding conditions of other BSs through the Xn interface) the ML algorithm may be trained to better allocate the RACH parameters to UEs.

The size of the RACH optimization problem may be large since the state space driving the ML procedure as well as the space of possible actions that the ML algorithm can take is large. Thus, according to an example embodiment, in order to simplify the RACH optimization problem and allow greater flexibility, trigger-based RACH reporting (where RACH information is reported specifically pertaining to one or more RACH trigger types) as a method to decompose the main RACH optimization problem into manageable (e.g., RACH-trigger specific) submodules. Thus, according to an example embodiment, the main ML algorithm may be split into a set of RACH trigger-specific ML submodules (e.g., a ML submodule provided for each of one or more RACH trigger types) coordinated by a RACH optimization coordinator (which may simply be referred to as a coordinator). According to an example embodiment, at least in some cases, this approach or technique may have one or more benefits or advantages, for example: Simplifies the ML algorithm (significantly reduces the state space) for RACH optimization. Different submodules (for different RACH trigger types) can be optimized independent of each other. For example, a RACH optimization coordinator can trigger Type 1 RACH optimization only without affecting the rest of the submodules. In an example embodiment, no timing restrictions need to be imposed among the different ML submodules. For example, as soon as the cost is computed at each submodule it may be reported to the RACH optimization coordinator. The RACH optimization coordinator may use the cost together with previously computed costs by other submodules and may adjust one or more RACH parameters and/or resource allocations. Also, in an example embodiment, ML algorithms (RACH optimization processes) at different BSs may exchange RACH information through the Xn interface on their calculated local (average) costs, and other information. For example, this may assist ML RACH optimization algorithms at different BSs to, e.g., make parameter or resource adjustments to attempt to equalize their cost with the neighbouring BSs so that equal RACH performance is sought.

Figure 3:
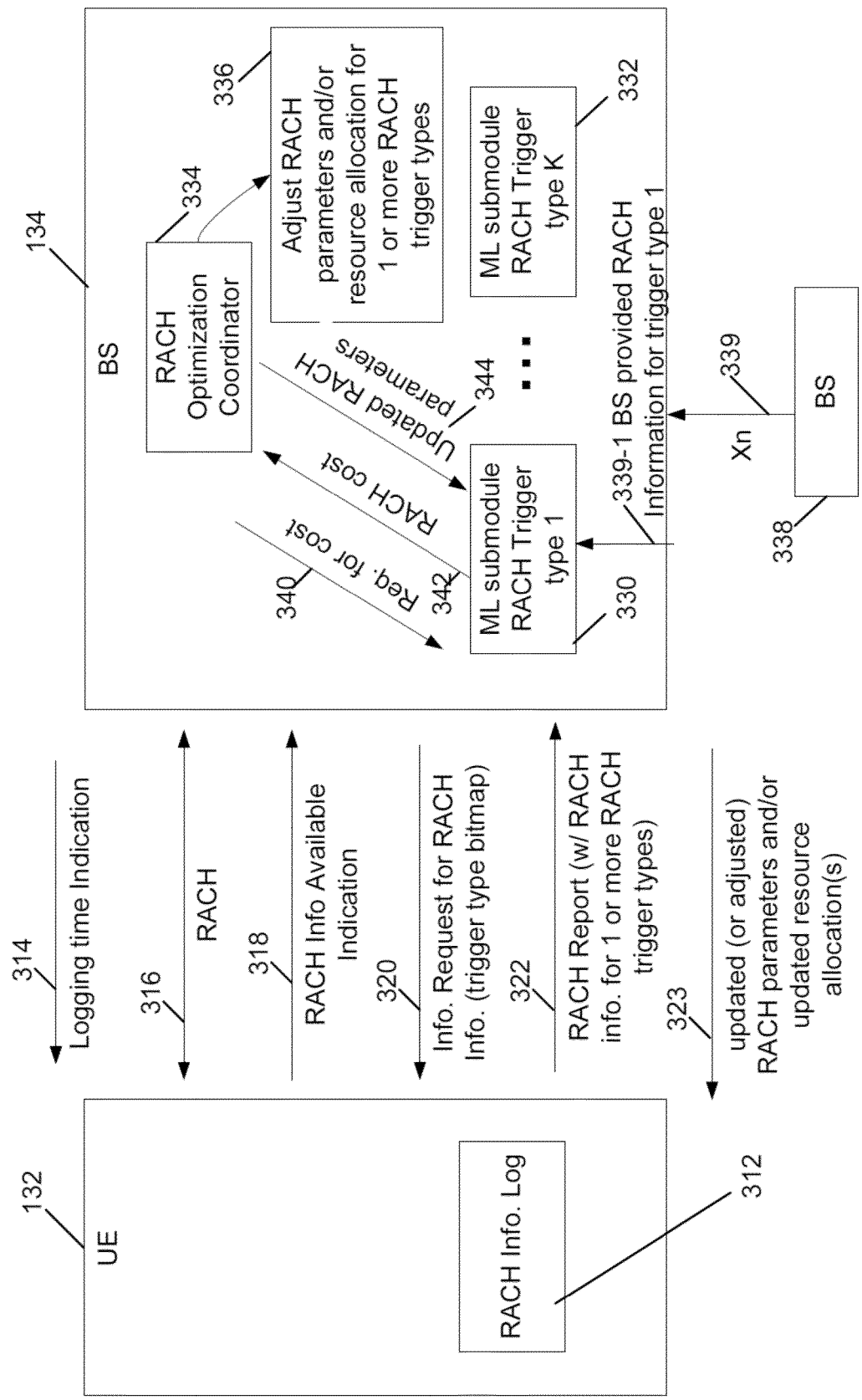
FIG. 3 is a diagram illustrating a system according to an example embodiment.

FIG. 3 is a diagram illustrating a system according to an example embodiment. A BS 134 may be in communication with a number of UEs, including UE 132. In an example embodiment, BS 134 may include, for example, at least one of a centralized unit (CU) and/or one or more distributed units (DUs) in the case of a split BS. UE 132 may perform a random access (RACH) procedure with a number of BSs, and for a variety of reasons or RACH triggers. UE 132 may log (or store), in RACH information log 312, RACH information for one or more RACH procedures of the UE. For example, at 314, the UE 132 may receive a logging time indication that indicates a time the UE should log RACH information. In such case, the UE 132 may log RACH information to RACH information log 312, e.g., beginning at the time indicated, or for the time indicated. At 316, UE 132 performs a RACH procedure with BS. RACH information stored in RACH information log 312 may include, for example, creating a log of RACH procedure information for each of one or more RACH procedure trigger types.

At 318, the UE may send to the BS a RACH procedure information availability indicator that indicates that the UE 132 has logged the RACH procedure information. In an example embodiment, the RACH procedure information availability indicator includes an indication of one or more RACH procedure trigger types for which RACH procedure information has been logged and is available (e.g., to be reported to BS).

Also, for example, UE 132 may send to the BS 134 an extended RACH report ability of the UE, indicating the UE's ability to send to BS 134 extended RACH procedure information for use in a RACH procedure optimization process. For example, the extended RACH procedure information may include detailed RACH information, e.g., such as, information of more RACH procedure parameters and/or information for more RACH procedures as compared to a normal RACH procedure information.

At 320, the UE 132 may receive an information request for RACH information. For example, at 320, the UE 132 may receive an information request including an indication of one or more RACH procedure trigger types for which RACH procedure information is being requested. For example, the information request may include a bitmap that indicates one or more RACH trigger types for which RACH information is being requested.

At 322, the UE 132 may send to BS 134 a RACH report including the RACH procedure information for the one or more indicated RACH procedure trigger types. The RACH report may be sent, e.g., in response to receiving the information request at 320. Alternatively, the UE sending a RACH procedure report at 322 may be caused or triggered by location-based information at the UE. For example, the UE may send the RACH procedure report at 322 when UE has a specific GPS (Global Positioning System) coordinate or location (or within a range of locations), when the UE is within a specific serving cell, the UE is within a specific tracking area (TA), or when the UE is within a specific RAN notification area, etc. Also, at 323, the UE 132 may later receive from BS 134 one or more updated (or adjusted) RACH parameters and/or updated resource allocation(s), e.g., based at least in part on the RACH report sent (at 322) by the UE 132 to BS 134.

According to an example embodiment, each of the RACH trigger types may include one or more of the following RACH trigger types (where a RACH trigger type is a cause or trigger for the UE performing a random access (RACH) procedure: initial access to a cell from a radio resource control (RRC) Idle mode, a radio resource control (RRC) re-establishment procedure, a handover of the user equipment, a downlink or uplink data arrival at the user equipment during a radio resource control (RRC) Connected mode when uplink synchronization status of the user equipment is non-synchronized, an uplink data arrival at the user equipment during a radio resource control (RRC) Connected mode when there are no uplink control channel resources available to send a scheduling request to a cell a, a scheduling request failure, a network request by a radio resource control (RRC) entity upon synchronous reconfiguration, a transition from a radio resource control (RRC) Inactive mode, an establishment of time alignment at a secondary cell (SCell) addition, a request of other system information (SI), or a beam failure recovery.

According to an example embodiment, an example RACH report (sent at 322) may include various RACH-related information, such as, for example, one or more of the following: the random access (RACH) procedure trigger type, which triggers the RACH procedure; a number of steps, either 2 steps or 4 steps, for the RACH procedure; a resource used for the RACH procedure, including one or more of: a bandwidth part index for a bandwidth part, a frequency, a synchronization signalling block (SSB) index (identifying a particular SSB), and timing information; a number of RACH preambles sent by the user equipment until a successful RACH procedure completion; a reason (or cause) for a RACH procedure failure (e.g., failure to receive a random access response (RAR), contention indication, or UE timeout) (in the case where a RACH procedure failed); and/or one or more RACH procedure configuration indexes used by the user equipment until a successful RACH procedure completion. Other parameters or information may be included as well.

Thus, as noted, BS 134 may receive a RACH report (at 322) from one or more UEs, such as from UE 132. BS 134 may also collect its own RACH information, e.g., based on RACH procedures the BS experienced from various UEs. BS 134 may also receive, from one or more other BSs, BS-communicated (or BS provided) RACH information via Xn (BS-to-BS) interface. For example, as shown in FIG. 3, BS 134 may receive RACH information 339 (e.g., including RACH information for one or more RACH trigger types) from BS 338 via Xn interface. For example, the BS-communicated RACH procedure information 339 may be based on RACH procedures performed by one or more UEs with respect to the reporting BS (338) and/or based on UE RACH reports received by the reporting BS.

According to an example embodiment, e.g., as part of a RACH optimization process, the BS 134 may determine cost information based on at least one of the RACH reports (at 322) received from the UE 132 (and possibly other UE RACH reports received from other UEs) and/or the BS communicated RACH procedure information (at 339) from BS 338 and possibly from other BSs. For example, the cost information (determined by the BS 134) may include a cost (e.g., RACH cost, or RACH procedure cost) for each of one or more of the RACH procedure trigger types. In an example embodiment, the cost information may include an average RACH cost for each of one or more RACH procedure trigger types. For example, the (per trigger type) RACH cost may include an average number of RACH preamble transmissions required to achieve RACH procedure success (e.g., separately determined for each RACH trigger type).

The BS 134 may adjust, based on the cost information, one or more RACH procedure parameters or adjust allocation of resources (e.g., RACH resources), for at least one of the plurality of RACH procedure trigger types. For example, the RACH optimization process at the BS 134 may adjust RACH parameters and/or allocate resources (e.g., RACH resources), to make the costs (e.g., average number of RACH preamble transmissions required for a successful RACH procedure) among all (or a subset, for example) of RACH trigger types to be equal or at least more equal. Thus, for example, RACH parameters may be adjusted and/or resources may be allocated to increase the average number of RACH preamble transmissions required for success for a low cost RACH trigger type (having a very good performance), and to decrease the average number of RACH preamble transmissions required for success when a RACH trigger type has a higher cost (having a very poor performance), e.g., so that the average costs for these two RACH trigger types should become more equal or nearer in value.

According to an example embodiment, the per trigger type cost may be a weighted cost, based on a trigger-specific weight. Thus, a cost may be a weighted RACH procedure cost for each of one or more of the RACH procedure trigger types, where a weight, e.g., assigned based on a relative priority of the RACH procedure trigger type, is applied to a base RACH procedure cost to obtain the weighted RACH procedure cost for the RACH trigger type. For example, the RACH optimization process may adjust RACH parameters and/or allocation of resources, e.g., in order to make costs among different RACH trigger types equal or more equal. Thus, a higher (or greater) weight may be applied or assigned to a high priority RACH trigger type, which will increase the weighted cost for that RACH trigger type, thereby causing the RACH optimization process to make parameter and/or resource allocation adjustments that will decrease the cost of such high priority trigger type. For example, for a RACH trigger type k: RACH procedure cost=base cost*W(k), where W(k) is a trigger-specific weight, e.g., where the base cost may include the average number of RACH preamble transmissions required for a successful RACH procedure. In this manner, the use of RACH trigger specific weights may allow prioritization (in terms of RACH parameters and/or resources) of one or more of the RACH trigger types. For example, if it is deemed more important or a priority for the RACH trigger type for "other system information (SI)", then a higher (greater) weight W(k) (compared to lower priority RACH trigger types) would be assigned to the "other SI" RACH trigger type, so that the RACH optimization process would adjust parameters and/or allocate resources to reduce the average number of RACH preamble transmissions required for a successful RACH procedure for "other SI" RACH trigger type.

FIG. 3 also illustrates an example embodiment for a RACH optimization process. A machine learning (ML) submodule (which may also be a neural network, or artificial neural network) is provided for each RACH trigger type. For example, ML submodule 330 is provided for RACH trigger type 1, . . . and ML submodule 332 is provided for RACH trigger type k, for k RACH trigger types. According to an example embodiment, each RACH trigger-specific ML submodule may receive RACH trigger specific RACH information from the UE RACH reports (e.g., from RACH report 322) and from BS communicated RACH information (at 339). For example, the portion of the BS communicated RACH information 339 that is specific to RACH trigger type 1 (339-1) is provided by BS 134 to ML submodule 330 via 339-1. As noted, each ML submodule may also receive a RACH trigger specific weight (W(k)), e.g., which may be based on a priority of the RACH trigger type. Each RACH trigger specific ML submodule (e.g., 330, . . . 332) may track a state of the RACH procedure for a RACH trigger type, where state may include channel information (e.g., including various RACH parameters) for the RACH trigger type, and may determine a cost for the RACH trigger type based on the RACH information for that RACH trigger type. The cost for each RACH trigger type may be reported to a RACH optimization coordinator 334 (which may be referred to as a coordinator, or a ML coordinator).

According to an example embodiment, as shown in FIG. 3, at 340, the RACH optimization coordinator 334 may send to a trigger-specific ML submodule 330 for RACH procedure trigger type 1, a request for a trigger type-specific RACH procedure cost or a request for RACH optimization (which causes ML submodule 330 to provide the cost). At 342, after determining the RACH trigger specific cost (or weighted cost), the ML submodule 330 for RACH trigger type 1 may send the cost for the RACH trigger type 1 to the RACH optimization coordinator 334. RACH optimization coordinator 334 may similarly obtain RACH trigger specific cost from each of the other RACH specific trigger types. At 336, the RACH optimization coordinator 334 may adjust RACH parameters and/or adjust resource allocations for at least one of the plurality of random access procedure trigger types, based on the received cost information (based on the relative costs, or weighted costs, from the submodule for each of the RACH trigger types). For example, the RACH optimization coordinator (which may be referred to as coordinator) 334 may reassign or change a bandwidth part, or RACH configuration, re-allocate one or more RACH preambles, etc., for one or more RACH trigger types, e.g., in order to decrease the average weighted cost of such priority RACH trigger type.

At 344, the RACH optimization coordinator 334 may send to the trigger-specific ML submodule 330 RACH procedure trigger type 1 (as an example), information indicating the one or more adjusted RACH procedure parameters or adjusted allocation of resources. Also, the BS 134 may then use the updated RACH parameters and/or resource allocation for one or more RACH procedures. For example, broadcast system information (SIB) and/or downlink control information transmitted by BS 134 to various UEs may be updated to reflect the adjusted RACH procedure parameters and/or adjusted resource allocation.

Additional example embodiments and illustrative details will be briefly described.

Figure 4:
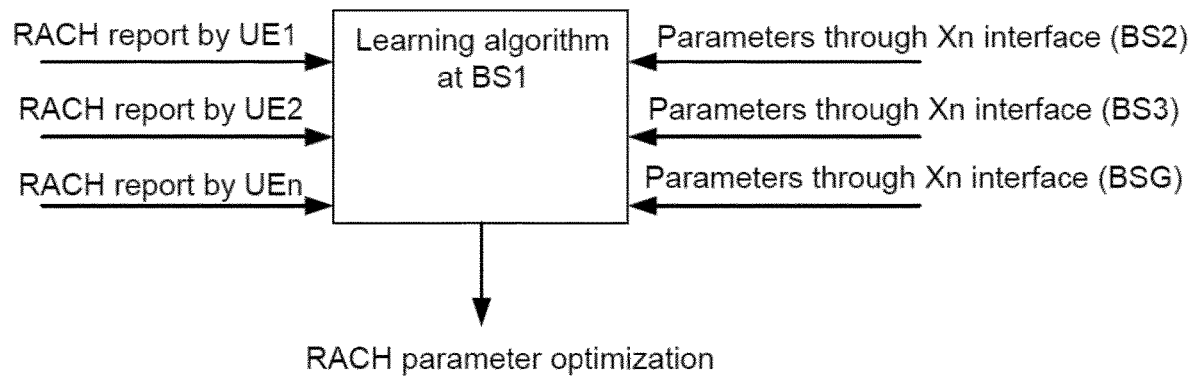
FIG. 4 is a diagram illustrating random access information received by a learning algorithm at a base station according to an example embodiment.
Figure 5:
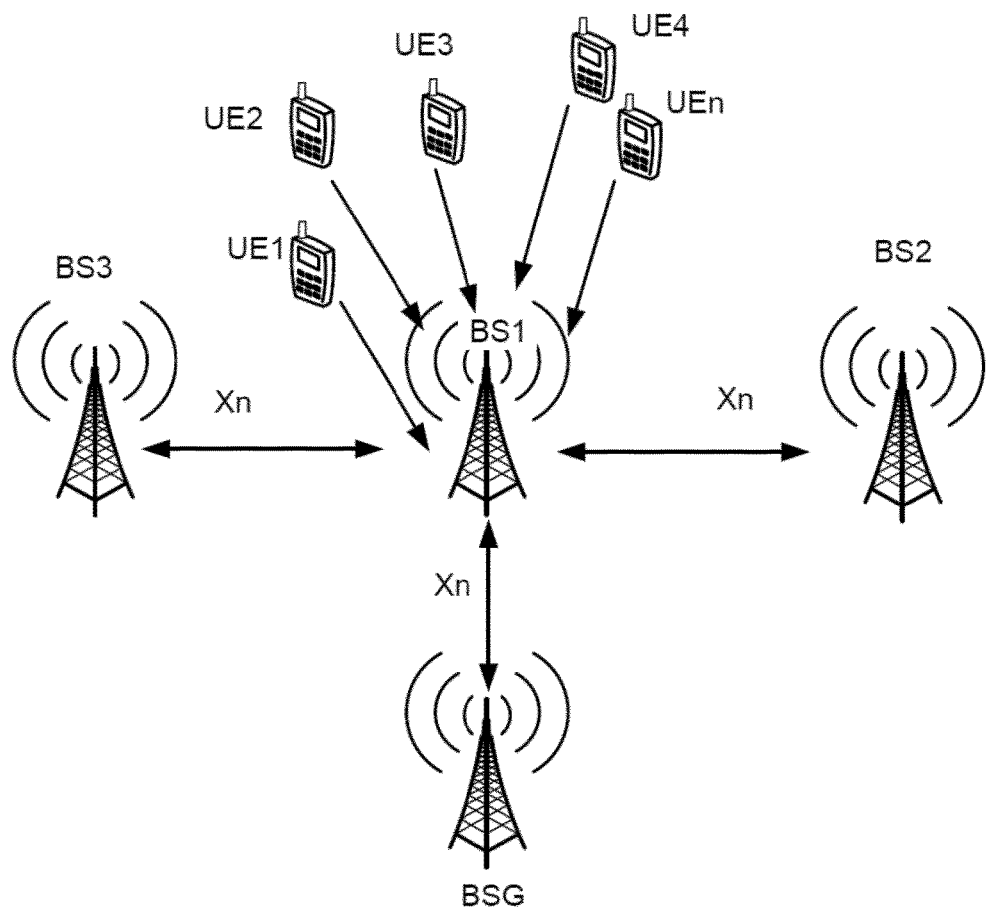
FIG. 5 is a diagram illustrating an example wireless network according to an example embodiment.

FIG. 4 is a diagram illustrating random access information received by a learning algorithm at a base station according to an example embodiment. FIG. 5 is a diagram illustrating an example wireless network according to an example embodiment. According to an example embodiment, a ML algorithm for RACH optimization may be provided at the BS (BS1) which receives RACH information from RACH report from the UEs (e.g., RACH report from UE1, UE2, and UE3) and also receives RACH information through the Xn (BS-to-BS) interface from one or more neighboring BSs (e.g., RACH information received from BS2, BS3, and BSG). This is illustrated in FIG. 4 which corresponds to a network as in FIG. 5.

Consider a network with N users in the system served by a BS. Assume also the existence of K RACH trigger types for RACH transmission. Assume that the number of RACH preamble transmissions until success for user/UE n=1, 2 . . . , N and for RACH type k is $r_n^{(k)}(t)$. Consider also the indicator function $s_n^{(k)}(t)$ which takes the value of 1 when the RACH preamble transmission of Type k leads to success for user n connected to BS at time t, and a value of zero when a RACH failure occurs. Then the system state may be defined to be a set of triplets over all users of number of transmissions and respective outcomes as well the variable $c_n^{(k)}(t)$ which describes the "channel characteristics" for user n for RACH type k at time t. The variable $c_n^{(k)}(t)$ depends on channel related parameters reported at the UE (e.g., preamble selection, RACH configuration index, BWP index, etc.) but also on the parameters exchanged at the Xn interface. Then the system state process X(t) is defined to be:

$$X(t)=(\{c_n^{(k)}(t),r_n^{(k)}(t),s_n^{(k)}(t)\}_{n=1\ldots N, k=1\ldots K}), \text{ for } t=0,1,2,\ldots.$$

Figure 6:
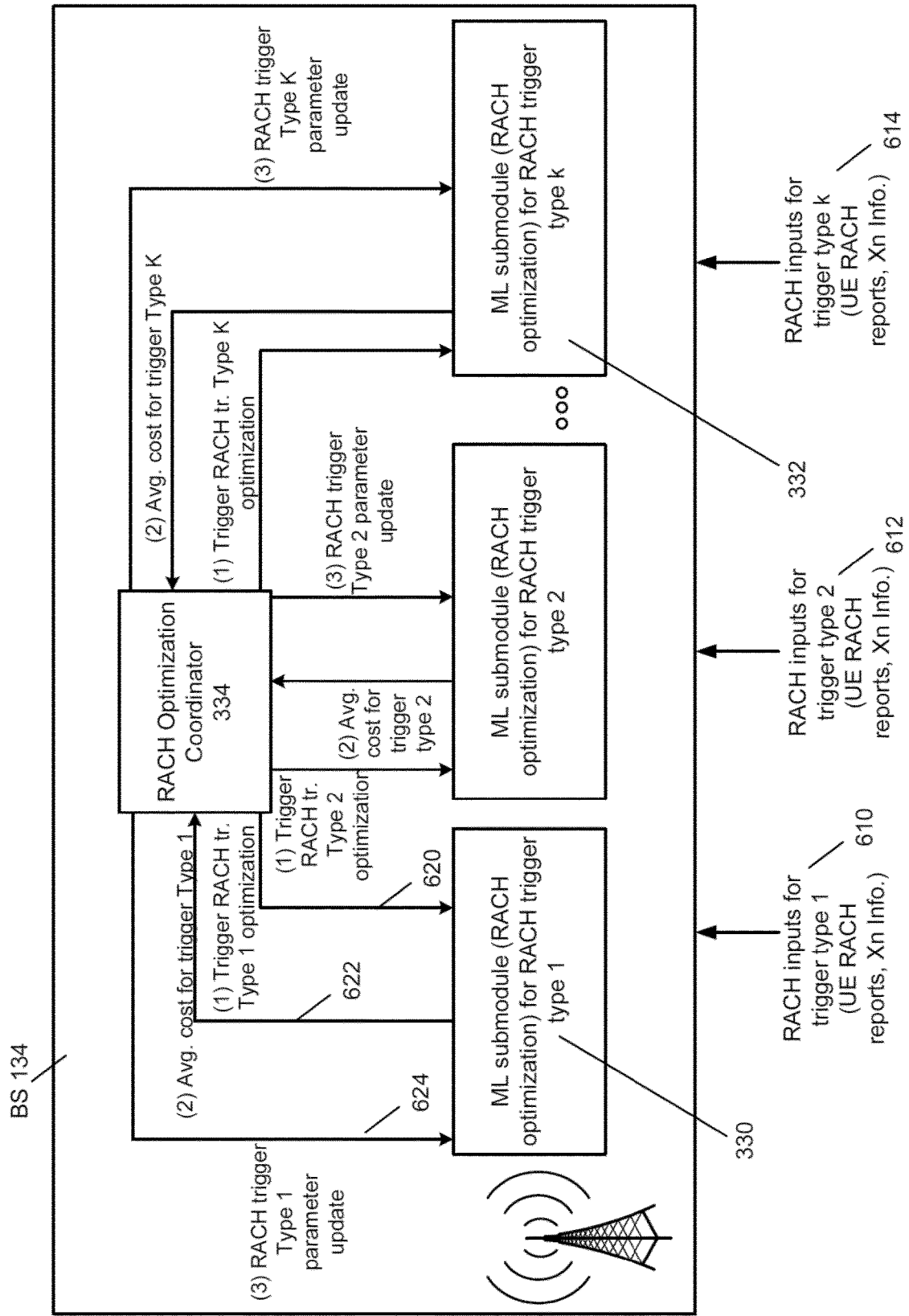
FIG. 6 is a diagram illustrating a RACH optimization coordinator and one or more machine learning submodules provided within a base station according to an example embodiment.

Instead of having a single ML element optimizing RACH performance (e.g., for all RACH trigger types), example embodiments may include multiple trigger-specific ML submodules, each optimizing a given RACH trigger type, and which may operate independently of each other as illustrated in FIG. 6. FIG. 6 is a diagram illustrating a RACH optimization coordinator and one or more machine learning submodules provided within a base station according to an example embodiment. Similar to FIG. 3, BS 134 includes a RACH optimization coordinator 334 (which may be referred to as coordinator), and a machine learning (or neural network) submodule for each of one or more RACH trigger types, such as a trigger-specific ML submodule 330 for RACH trigger type 1 and a trigger-specific ML submodule 332 for RACH trigger type k.

Referring to FIG. 6, at 610, BS 134 may receive RACH information for RACH trigger type 1, including RACH reports from UEs and BS-communicated RACH information from other BSs via Xn interface. Likewise, at 612 and 614, BS 134 may receive RACH information for RACH trigger type 2 and RACH trigger type k, respectively. The RACH information (received at 610) for trigger type 1 may be forwarded to ML submodule 330 for trigger type 1. Likewise, RACH information for other RACH trigger types are forwarded to the associated ML submodule.

Also, referring to FIG. 6, RACH optimization coordinator 334 may send a request to perform trigger type 1 RACH optimization, e.g., by sending a request for a cost for RACH trigger type 1. At 622, the ML submodule 330 for trigger type 1 may send a cost (obtained by the RACH optimization process) for RACH trigger type 1 to RACH optimization coordinator 334. RACH optimization coordinator 334 may similarly receive costs from other ML submodules of other RACH trigger types, and then may determine one or more adjusted RACH parameters and/or adjusted resource allocations, based on the cost information.

At 624, after determining adjusted RACH parameters or resource allocations, the RACH optimization coordinator may send the adjusted RACH parameters or resource allocations for RACH type 1 to ML submodule 330 for RACH trigger type 1. Operations similar to 620, 622, and 624 may be performed with respect to other ML submodules for other RACH trigger types.

The output of each ML submodule may be an average cost computed for each initial state. The RACH optimization coordinator 334 may compute the total average cost by adding all sub-costs together (costs of the various RACH trigger types).

To enable ML algorithms on a modularized fashion, a BS requesting RACH report information from a UE (e.g., by setting the rachReportReq-r9 value to true (in UEInformationRequest message) indicates which RACH trigger types the UE must report. This means that the BS (network) can signal a UE to report RACH information for all possible combinations or subsets of the k RACH trigger types. Those can be signalled by an ordered bitmap of RACH trigger types whose length is equal to K (total number of different RACH trigger types) in the general case. Each value (or bit)

of the bitmap may be a 1 if the indicated type must be reported and a 0 otherwise, for example. The bitmap can have more than 1 entry equal to 1 to indicate that reporting is requested for more than 1 RACH trigger types. The bitmap can be omitted if information on all RACH types is requested by the BS.

As an additional embodiment, the UE may send to a BS a RACH Report Availability Indicator. This indicator can further indicate (e.g., by including a RACH trigger type bitmap) regarding the particular RACH trigger type(s) for which a UE RACH Report is available. Subsequently, the network (BS) may request with the UEInformationRequest a subset of the RACH Reports (for one or more of the indicated RACH trigger types) that are available at the UE.

Figure 7:
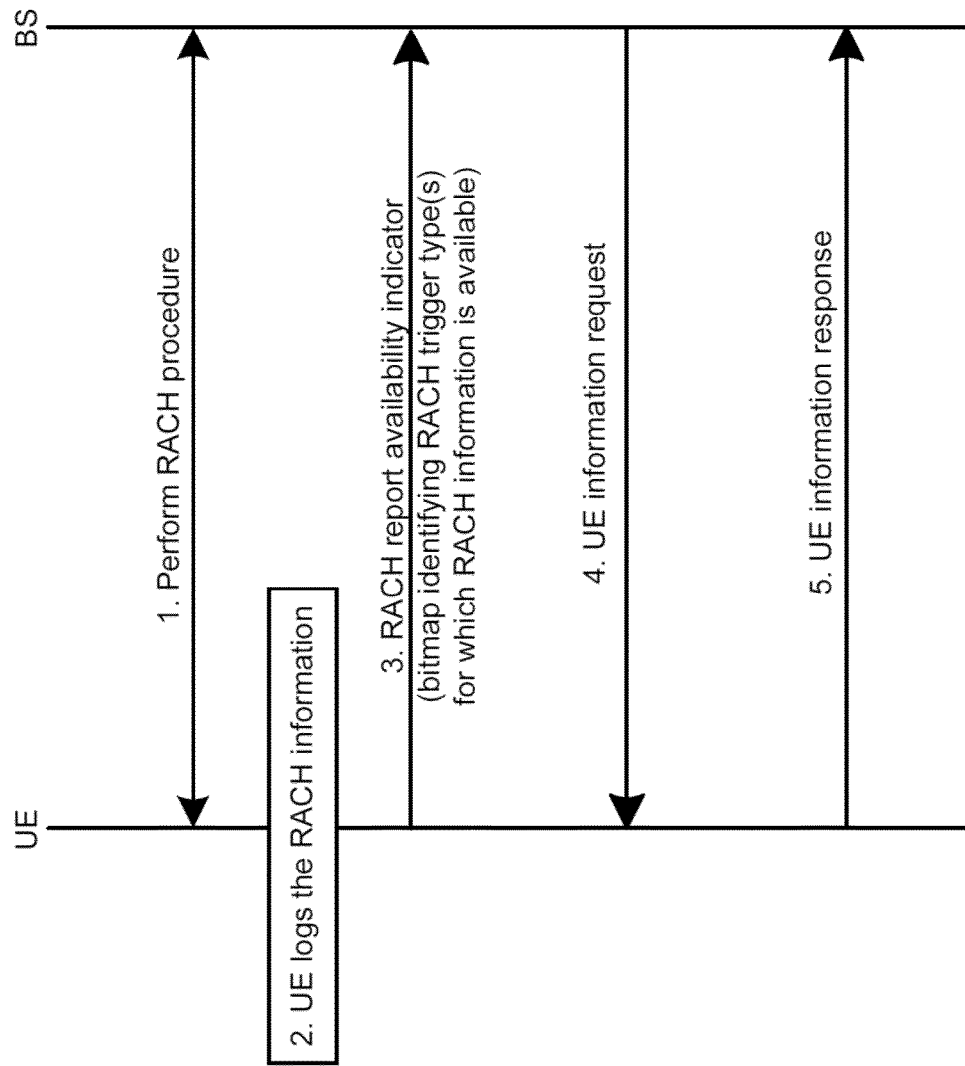
FIG. 7 is a diagram illustrating a message flow for basic RACH information retrieval according to an example embodiment.

FIG. 7 is a diagram illustrating a message flow for basic RACH information retrieval according to an example embodiment. 1. UE performs RACH on a Cell controlled by the BS. 2. UE logs the information related to the RACH procedure (for one or more RACH trigger types) in internal variables within the log. 3. The UE informs the BS that it has logged some information about the RACH procedure, e.g., by sending a RACH report availability indicator with a bitmap that indicates for which RACH trigger types RACH information is available to be reported. For example, in a RRC message like RRC Reconfiguration Complete. 4. The BS requests the UE to send the available information in UEInformationRequest message. In this message the BS can indicate which Report UE should include via a bitmap as described above. 5. The UE sends back the requested information in a UEInformationResponse message that include the RACH information (e.g., RACH statistics) from the UE.

According to an example embodiment, a RACH optimization coordinator at the BS may signal the UE with a time indication (which may be referred to as a logging time indication) with which the network requests from a UE to log RACH related information starting from RACH trigger types indicated by the bitmap. The end of the reporting period can be indicated by the network either a) through implicit signaling or b) be included in the timing indication. An example of implicit signaling can be that the number of RACH failures for a specific type of RACH exceeds a certain threshold.

Figure 8:
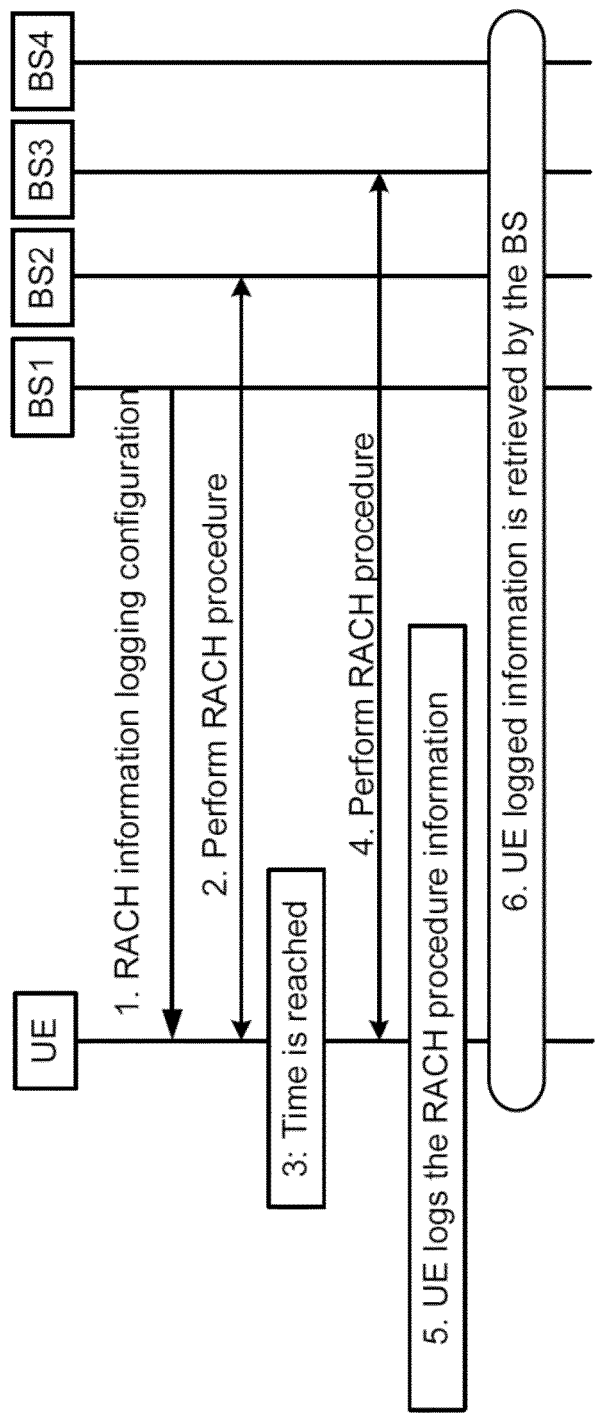
FIG. 8 is a diagram illustrating a message flow for RACH information retrieval according to another example embodiment.

FIG. 8 is a diagram illustrating a message flow for RACH information retrieval according to another example embodiment. 1. BS1 configures the UE for the RACH report with a time indication to when to start the logging of RACH information. 2: UE performs RACH on a Cell controlled by the BS2 (note that BS2 could be the same as BS1). UE does not log any information. 3. The time (based on logging time indication) is reached. Meaning that UE will start logging RACH information about RACH procedures. 4. UE performs RACH on a Cell controlled by the BS3. (note that BS3 could be the same as BS1 or BS2). 5. UE logs (for one or more RACH trigger types) the RACH information related to the RACH procedures in internal variables. The rest of the procedure of FIG. 8 is the same as the steps (operations) 3, 4 and 5 of FIG. 7. UE reports the available RACH information to BS3. BS3 could be the same as BS1 and/or BS2.

According to an example embodiment, the beginning of the RACH reporting can be triggered implicitly by location-based information at the UE. For example, if the UE finds itself in a certain area then it can start the RACH reporting to the network. The network in this way can optimize RACH on a location-based fashion. This could be useful to optimize RACH for SUL (supplementary uplink, which are a lower set of frequencies, which have greater range, and may typically be used by UEs located near a cell edge) as the SUL is probably used by users far from the BS.

In an example embodiment, the RACH optimization coordinator at the BS indicates in the RACH information request whether the RACH report will be used for RACH optimization (or ML optimization) and can request different report granularities (different amounts or a different amount of details) of RACH reporting by the UEs (e.g., normal RACH report, and extended RACH report, as some examples). For example, two predefined levels (normal, extended) of reporting can be used. Normal reporting could imply that the UE must report RACH related information for the last successful RACH procedure and it is used for instance at BSs without ML capability. Extended reporting could mean that the UE needs to report RACH related information for the last x number of successful RACH completions, and/or provide more detailed RACH information in the RACH report.

For example, when the UE receives from the RACH optimization coordinator in the BS a UEInformationRequest message in which reporting is requested (explicitly or implicitly), the UE may keep or store a RACH information log on the involved parameters separately for different RACH trigger types, and store them in a RACH report. Specifically, the UE may indicate in a response to the network its ability to create a (an extended) RACH report for RACH or ML optimization or not. For example, if a UE is in a power save mode it may not be able to provide the network with extended RACH reporting. In that case, it indicates that normal reporting is sent back to the network.

Figure 9:
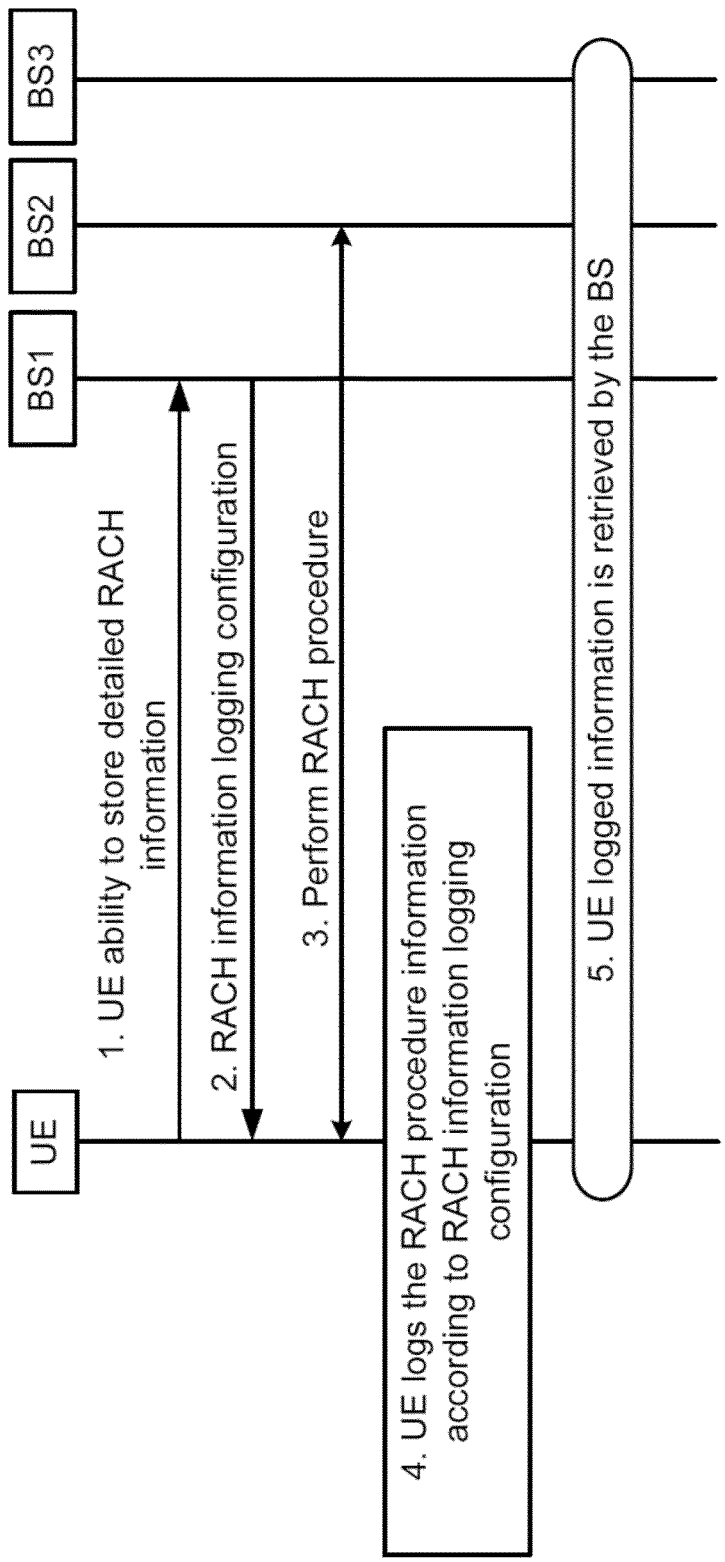
FIG. 9 is a diagram illustrating a message flow for configuration of a UE for RACH information retrieval according to an example embodiment.

FIG. 9 is a diagram illustrating a message flow for configuration of a UE for RACH information retrieval according to an example embodiment. 1. UE indicates to the network its ability to store detailed RACH information. This could depend on the UE's internal memory. As an alternative this step could be omitted if such information is included in the UE Capabilities information element (IE). 2. BS1 configures the UE for the RACH report with the indication that the RACH report will be used for RACH optimization or ML and therefore ask for increased logging of RACH information. 3. UE performs RACH on a Cell controlled by the BS2 (note that BS2 could be the same as BS1). 4. UE logs the information related to the RACH procedure in internal variables, according to the requirements signaled in the message 2. 5. The rest of the procedure is the same as the steps 3, 4, 5 of FIG. 7.

According to an example embodiment, the UE may store or create a different RACH information log for each different RACH trigger type. A set of bits can be used to indicate the trigger type, e.g., the reason that triggered the RACH procedure (e.g., Initial Access from RRC_IDLE, RRC re-establishment procedure, Handover, DL or UL data arrival during RRC_CONNECTED when UL synchronization status is "non-synchronized", UL data arrival during RRC_CONNECTED when there are no PUCCH resources for SR available, SR failure, Request by RRC upon synchronous reconfiguration, Transition from RRC_INACTIVE, Establishment of time alignment at SCell addition; Request of Other SI, Beam Failure recovery).

Furthermore, for each differently triggered RACH procedure (or for each RACH trigger type), the UE may store the number of RACH preambles sent until successful RACH completion.

Additionally, for physical layer RACH (also referred to as PRACH) configuration indexes that involve more than 1 number of PRACH occasions within a PRACH slot, the number of used PRACH occasions can also be reported within the PRACH slot. Alternatively, if this information is available, the UE can store the different RACH configuration indexes used until successful RACH completion.

Also, UE may further include in the RACH report the following information:

Example "Information in RACH Report:" (some examples of information that may be included in a RACH report):

1) RACH trigger type: Is it for: Initial Access from RRC_IDLE, RRC re-establishment procedure, Handover, DL or UL data arrival during RRC_CONNECTED when UL synchronization status is "non-synchronized", UL data arrival during RRC_CONNECTED when there are no PUCCH resources for SR available, SR failure, Request by RRC upon synchronous reconfiguration, Transition from RRC_INACTIVE, Establishment of time alignment at SCell addition; Request of Other SI, Beam Failure recovery. Other options can be introduced in future releases
2) The number of RACH steps: Is the RACH a two-step RACH or 4-step RACH procedure
3) For each triggered RACH procedure, the UE reports a new type of RACH resource on which the RACH took place that may include the following information:
   a) The BWP (bandwidth part) index in which RACH is performed (in case a BWP is activated). A UE can be configured in the uplink with up to 4 BWPs. All active BWPs on which RACH is performed may be reported.
   b) The SSB (synchronization signal block) index on which the transmission (RACH preamble transmission) took place.
   c) Timing information (e.g., subframe, slot, time offset with respect to a frame or subframe or slot, which may be part of or indicated by the RACH configuration, or other RACH transmission timing information).

According to an example embodiment, the source (receiving the RACH information) BS and target BS may exchange the following parameters over the Xn interface: (these are some example RACH information that may be included as BS-communicated RACH information via Xn interface), as some illustrative examples.

"information sent on Xn interface" may include one or more of the following, for example:
1) a proportion of UEs using SUL at a given BS. This information gives implicitly the proportion of users likely in the cell edge for the BS whose transmissions would likely interfere with nearby transmissions or whose signal could be low at the target BS. Additionally, this information gives the proportion of the non-SUL users.
2) Resource statistics information: How many transmissions take place on a given "resource" (triplet of frequency, time and beam information) and proportion of successful transmissions. How many users are given a certain RACH resource. The above two can give information on the utilization of a given resource
3) RACH preamble statistics information: How many transmissions take place using a given preamble and which proportion of those are successful. How many users are given a RACH preamble/preamble type.
4) The average cost of the RACH optimization algorithm (averaged over all submodules) computed by the RACH optimization coordinator. Also information may be provided over Xn interface relating to or describing the ML algorithm or ML model used for RACH optimization.
5) The RACH Report of UE about RACH procedures that were performed in cells controlled by the target BS, but collected in the source BS (e.g., in case of mobility).

The parameters 1, 2 and 3 can be used by the trigger type—specific ML submodules to estimate cn(k)(t) (it gives background information on the RACH allocations of other BSs which can e.g., help the algorithm compute the inter-RACH interference). A RACH optimization coordinator may receive RACH information and RACH trigger-specific costs reported by one or more neighbor BSs. Thus, for example, a BS or RACH optimization coordinator may also adjust RACH parameters and/or resource allocation to assist (e.g., decrease cost of) one or more RACH trigger types of a neighbor cell, e.g., to decrease conflicts or interference from current cell/BS to one or more high cost RACH trigger types reported by a neighboring cell.

Figure 10:
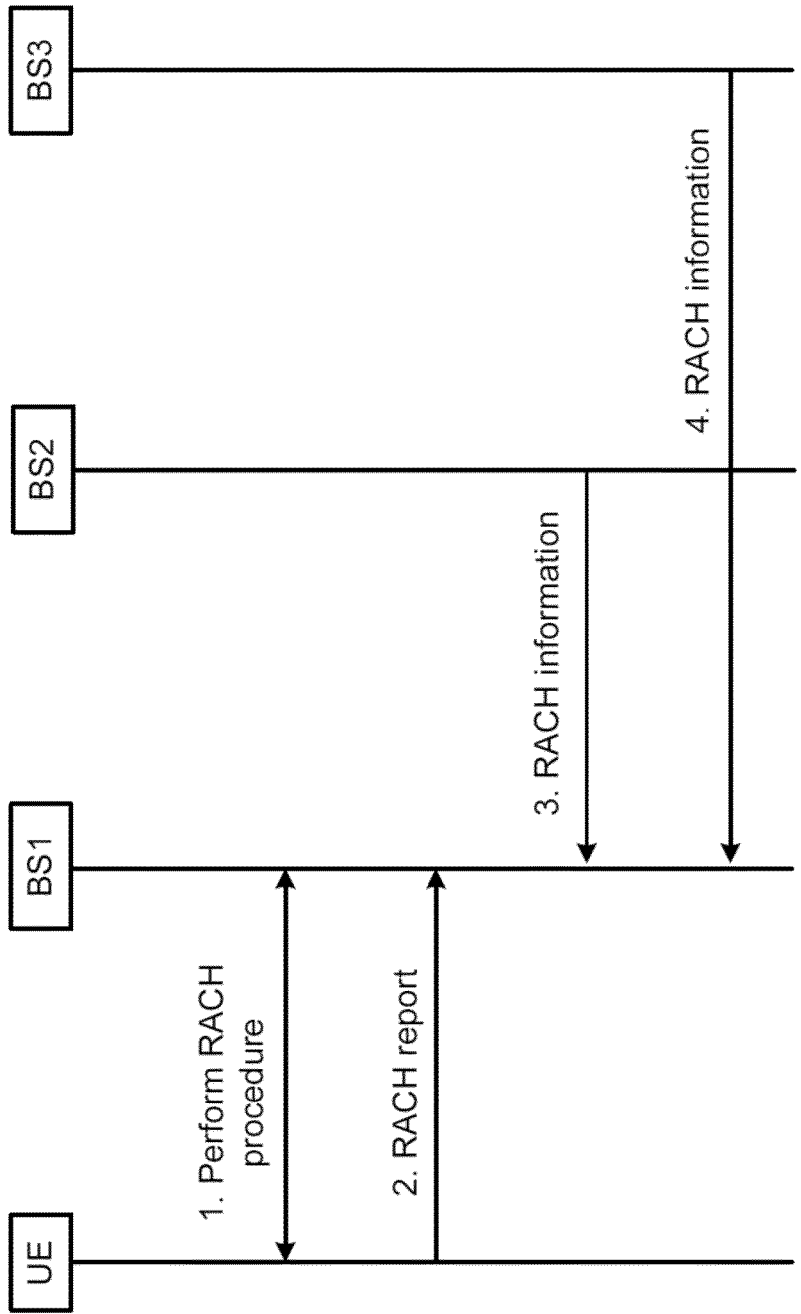
FIG. 10 is a diagram illustrating a message flow for configuration of a UE for RACH information collection according to another example embodiment.

FIG. 10 is a diagram illustrating a message flow for configuration of a UE for RACH information collection according to another example embodiment. 1. The UE performs RACH procedure on a Cell controlled by BS1. 2. The UE sends a RACH report (for one or more RACH trigger types) about the RACH procedure performed in a Cell controlled by BS1. The steps 1 and 2 can be repeated. The UE may also send logged information of RACH performed on Cells controlled by other BSs than BS1. In this case the information will be sent to BS via the "information sent on Xn interface". 3. BS2 sends information to BS1 about RACH gathered at BS2. Information is sent over the Xn interface by using the element described above ("information sent on Xn interface"). 4. BS3 performs similar step as step 3.

Example ML Algorithm with Simplified State Space

According to an illustrative example embodiment, the state space $(X^{(k)}(t))$ of each ML submodule k may be determined or provided based on the following:

$$X^{(k)}(t)=(\{c_n^{(k)}(t),r_n^{(k)}(t),s_n^{(k)}(t)\}_{n=1 \ldots N}), \text{ for } t=0, 1, \ldots.$$

So the ML algorithm of each submodule uses the process $X^{(k)}(t)$, for $t=0, 1, \ldots, T$, which is a 1×2N dimensional vector with T being the horizon. The cost may be defined as a cost to go from state $X^{(k)}(t)$ to state $X^{(k)}(t+1)$ for submodule Type k as $z_{X(t)X(t+1)}^{(k)}(t)$. This may be proportional to the state variable $r_n^{(k)}(t+1)$ of state $X^{(k)}(t+1)$ of a given Type k, scaled by a positive factor $w^{(k)}$ (or weight). One example of cost is $z_{X(t)X(t+1)}^{(k)}(t)=\Sigma_{n=1}^{N}(r_n^{(k)}(t+1))$, namely the number of RACH transmissions of a particular trigger type (which corresponds to $w^{(k)}=1$). By choosing higher weights or factors $w^{(k)}$ for a certain RACH trigger type k, the state process may be forced to take decisions with smaller chances of needing to retransmit (more likely to have RACH success).

In an example embodiment, the RACH optimization coordinator can allocate more resources for a given RACH trigger type based on the communicated weight, e.g., to keep the "sub-costs" reported by the submodules balanced (or equal or approximately equal among the different RACH trigger types).

For example, a set of terminal states may be defined to be the states for which the indicator variable $s_n^{(k)}(t)$ takes the value 1, namely a UEn has succeeded with its RACH transmission for trigger type k. For each terminal state $X^{(k)}(t)$ the cost $z_{X(t)X(t+1)}^{(k)}(t) = \Sigma_{n=1, \ldots N: s_n^{(k)}(t) \ne 1} (r_n^{(k)})$. When $s_n^{(k)}(t)=1$ for every n then the cost is 0. If a new RACH of trigger type k takes place, the system can move from terminal state to an initial state.

Also, a set of states may be defined for which if the maximum number of transmissions is reached (preamble-TransMax is reached in the corresponding variable $r_n^{(k)}(t)$ measuring the transmissions) they have an infinite cost. Cost is non-negative. An optimal policy may, for example, avoid entering such states. So, reaching a terminal state at least under an optimal policy is inevitable for this problem definition, according to an example embodiment. Note also that since the variable $r_n^{(k)}(t)$ is non-decreasing the state of this process is acyclic. So, this problem has a finite horizon (even though the horizon T in this process defining when termination will be reached is random, it will terminate in finite (average) time).

Having formulated the RACH optimization problem as such it can be shown that it satisfies Bellman Equations and can be solved through Dynamic Programming methods and through the Value Iteration. Calculating the transition probabilities from one state to another as well as the state of the system may use training of each ML submodule. To perform the training, RACH information of the UE RACH report by the UEs and one or more of 1) proportion of UEs using SUL, 2) resource statistics information, and/or 3) RACH preamble statistics information communicated through the Xn interface ("information sent on Xn interface") may be used, for example. Note that depending on the "length of the reporting" and on the time within which a UE is collecting data the transition probabilities from one state to another and for a given RACH trigger Type k may be just time averages (if no convergence is achieved). The $c_n^{(k)}(t)$ state of user n for RACH Type k at time t may be determined based on, e.g., information sent through a UE RACH report and information sent through Xn interface.

FIGS. 11-14 illustrate different architectures and/or message flows for use of a split centralized unit (CU) and/or one or more distributed units (DUs) in the case of a split base station.

Figure 11:
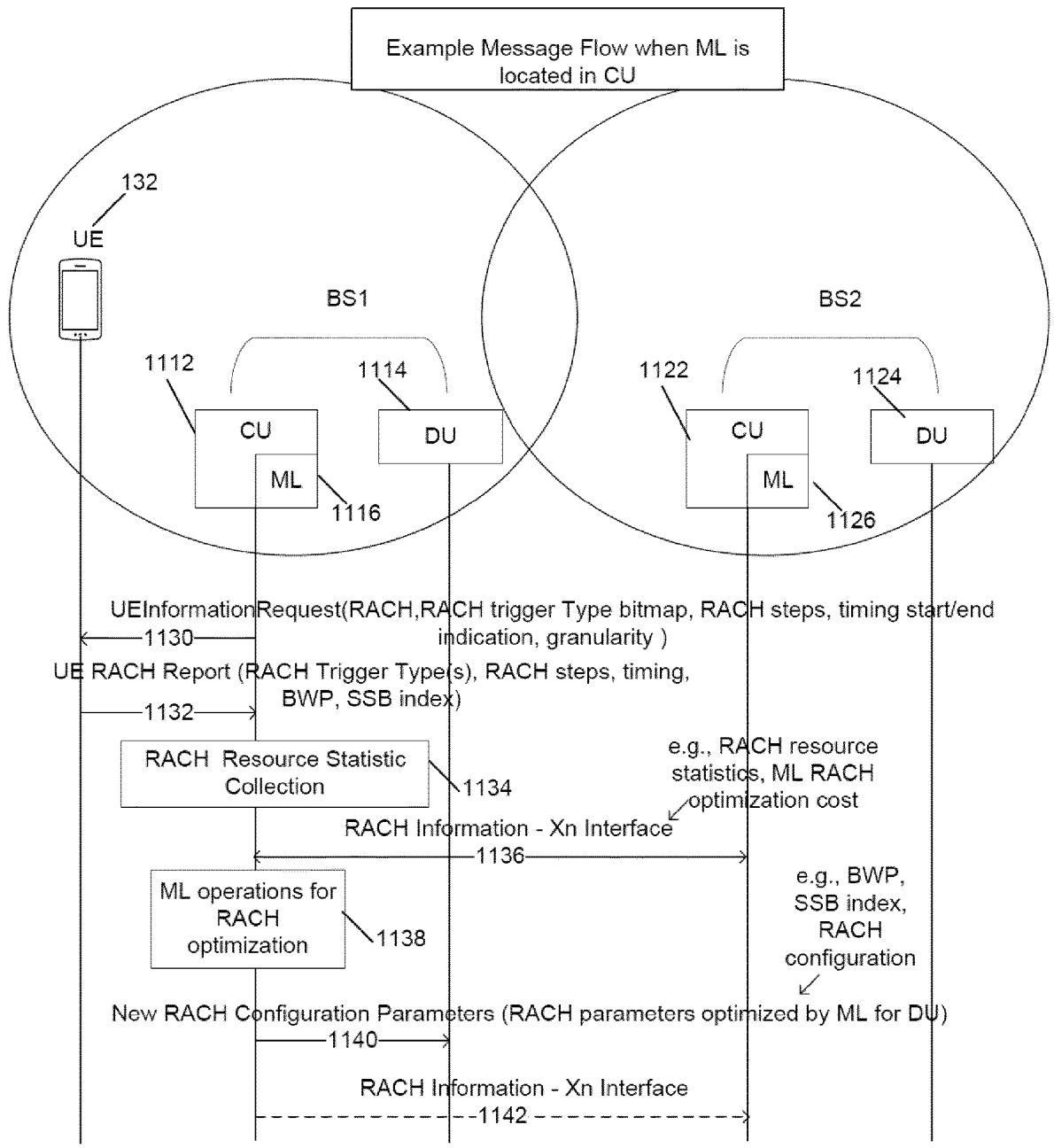
FIG. 11 is a diagram illustrating a message flow for when a machine learning (ML) algorithm for RACH optimization is provided in a centralized unit (CU) in the case of a split base station according to an example embodiment.

FIG. 11 is a diagram illustrating a message flow for when a machine learning (ML) algorithm for RACH optimization is provided in a centralized unit (CU) in the case of a split base station according to an example embodiment. In FIG. 11, a UE 132 may be in communication with a BS1. Also, BS1 may be in communication with other BSs, such as BS2. BS1 and BS2 includes a split BS architecture. BS1 includes a CU 1112 and a DU 1114. A ML algorithm (e.g., which may include ML submodules for each of a plurality of RACH trigger types, and a RACH optimization coordinator) may be provided or located on CU 1112. Similarly, BS2 may include a CU 1122 that includes a ML algorithm 1126, and a DU 1124. At 1130, CU 1112 requests RACH information from the UE 132 by sending a UEInformationRequest. The request may include one or more parameters, e.g., such as a RACH trigger type bitmap to indicate for which RACH trigger types RACH information is being requested, timing information that indicates a time for which RACH information is being requested, a BWP (bandwidth part) for which RACH information is being requested, an indication of a number of RACH steps (e.g., 2 step or 4 step RACH) for which information is being requested, and a granularity (or amount of reporting) of a requested RACH report (e.g., normal report or extended report). At 1132, UE 132 responds with the RACH report of measurements according to the parameters indicated in the request. At 1134, the CU 1112 may perform RACH Resource Statistic Collection, e.g., as described in FIG. 12. In brief, it involves requesting by the CU information available at the DUs (to be used in the ML algorithm at the CU). At 1136, through the Xn Interface, the CU 1112 receives RACH information of neighbouring BSs (or from the CU part of those BSs) and also communicates to neighbouring BSs its own RACH Information.

At 1138, ML operations may be performed for RACH optimization. For example, after receiving both the RACH report (at 1132) and the RACH information (at 1134 and 1136) (e.g., such as RACH resource statistics) through the Xn interface, the CU 1112 can start (or perform) its ML RACH optimization algorithm. For example, based on trigger-specific cost information provided by each RACH trigger-specific ML submodule, the RACH optimization coordinator (e.g., see FIG. 3) may determine a new (e.g., optimal) set of RACH parameters and/or RACH resources, such as an optimal preamble or set of preambles and a RACH resource (e.g., a frequency, time and beam related parameters) to be used for one or more (or all) RACH trigger types. For instance, it may adjust the number of preambles allocated to a particular trigger type by allocating more preambles for trigger types where the cost is too high or decreasing the number of preambles accordingly. Similarly, the allocated type of preamble could be controlled by giving more robust (longer) preamble formats to trigger types with higher cost (to cause the cost for this high-cost trigger type to be reduced). The optimal or new set or RACH parameters or resources may be selected or designed to adjust a cost of one or more RACH trigger types (e.g., RACH parameters selected to make costs among multiple RACH trigger types to be equal or more equal, according to an illustrative example embodiment). The optimal ML RACH solution (e.g., adjusted or new RACH parameters and/or resource allocations) is then signalled at 1140 to each DU (e.g., the best choice of frequency (or BWP), time or timing (e.g., BWP), beam related parameters (e.g., SSB index) that should be used at the scheduler in the DU) and also through the Xn interface to the other CUs at 1142. In a different implementation (and to reduce Xn signalling) a BS may send its optimized "RACH Information over the Xn" only when its neighbours request it and only to those neighbours.

For example, with respect to the ML operations for RACH optimization at 1138 (regardless whether the BS is split or not), the new or adjusted RACH parameters may include one or more new or adjusted RACH parameters that may be used by UEs to perform random access procedure(s) (e.g., such as RACH preamble transmission). In an example embodiment, such new RACH parameters (and/or RACH resource allocations) may be designed to increase the cost (e.g., average number of RACH preamble transmissions required for RACH success) of some RACH trigger types, and may be designed to decrease the cost of other RACH trigger types. For example, the new or adjusted RACH parameters may include one or more parameters that may be used for RACH preamble transmission, such as, e.g., a bandwidth part (BWP) or frequency range, a synchronization signalling block SSB index (e.g., which is associated with a SSB beam to be used for RACH preamble transmission), a RACH configuration (which may indicate a preamble format, and timing information such as a subframe number, slot number, etc. for RACH preamble transmission), and/or other RACH parameters. In an example embodiment, one or more RACH parameters may be determined for one or more RACH trigger types, and such parameter(s) may be different for other RACH trigger types.

Figure 12:
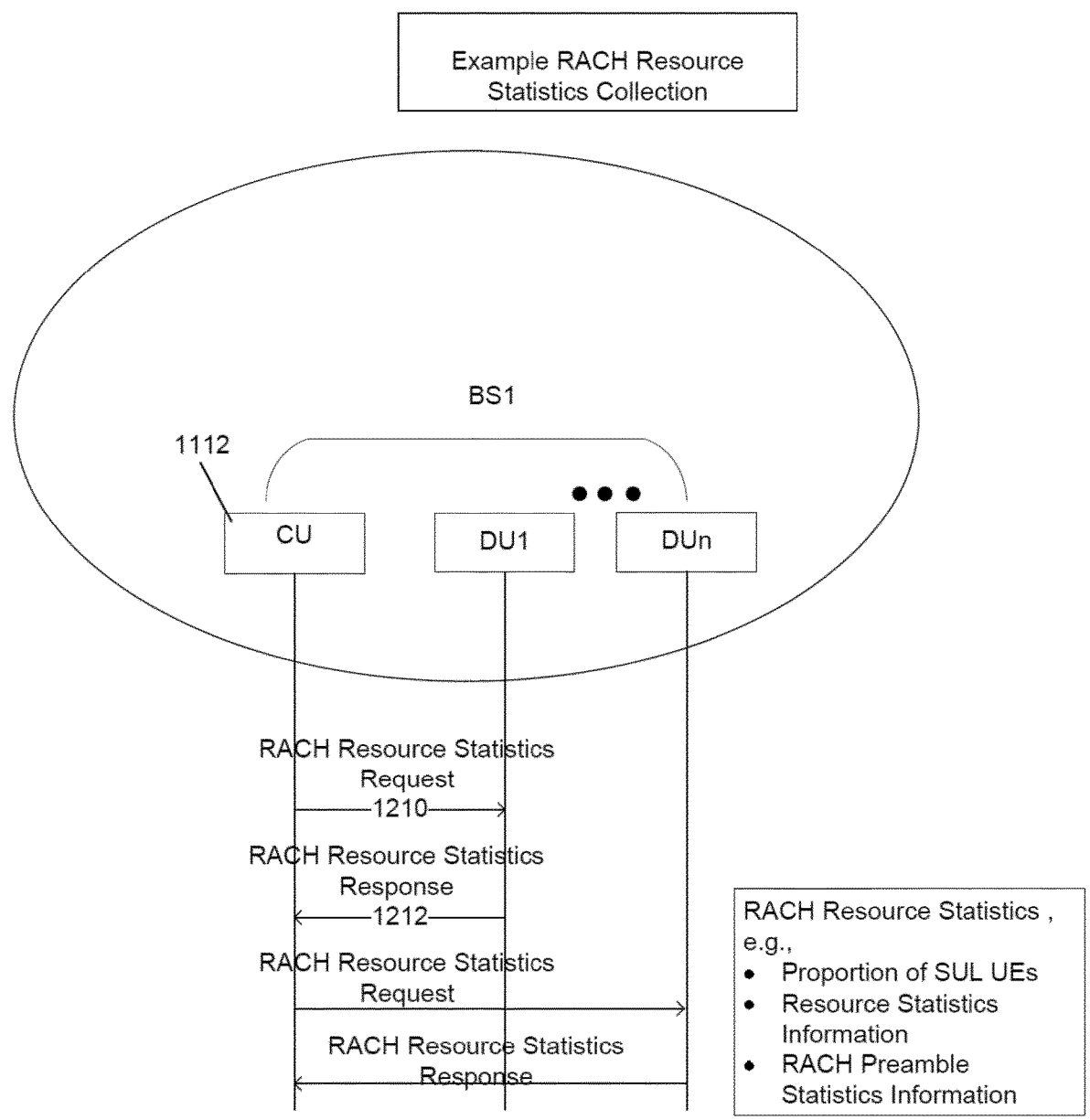
FIG. 12 is a diagram illustrating a RACH resource statistic collection according to an example embodiment.

FIG. 12 is a diagram illustrating a RACH resource statistic collection according to an example embodiment. FIG. 12 indicates a communication between CU and a DU within the CU. CU collects information that is available at its DUs, e.g., information related to scheduling in a DU such as for example: a proportion of SUL (supplementary uplink) UEs, resource statistics information, and RACH preamble statistics information, for example, as part of the "information set on Xn interface". For example, as part of this collection, the CU 1112 may send a RACH resource statistics request 1210 to DU1, and then receive a RACH resource statistics response at 121 from DU1. A similar message exchange may be performed with other DUs.

Figure 13:
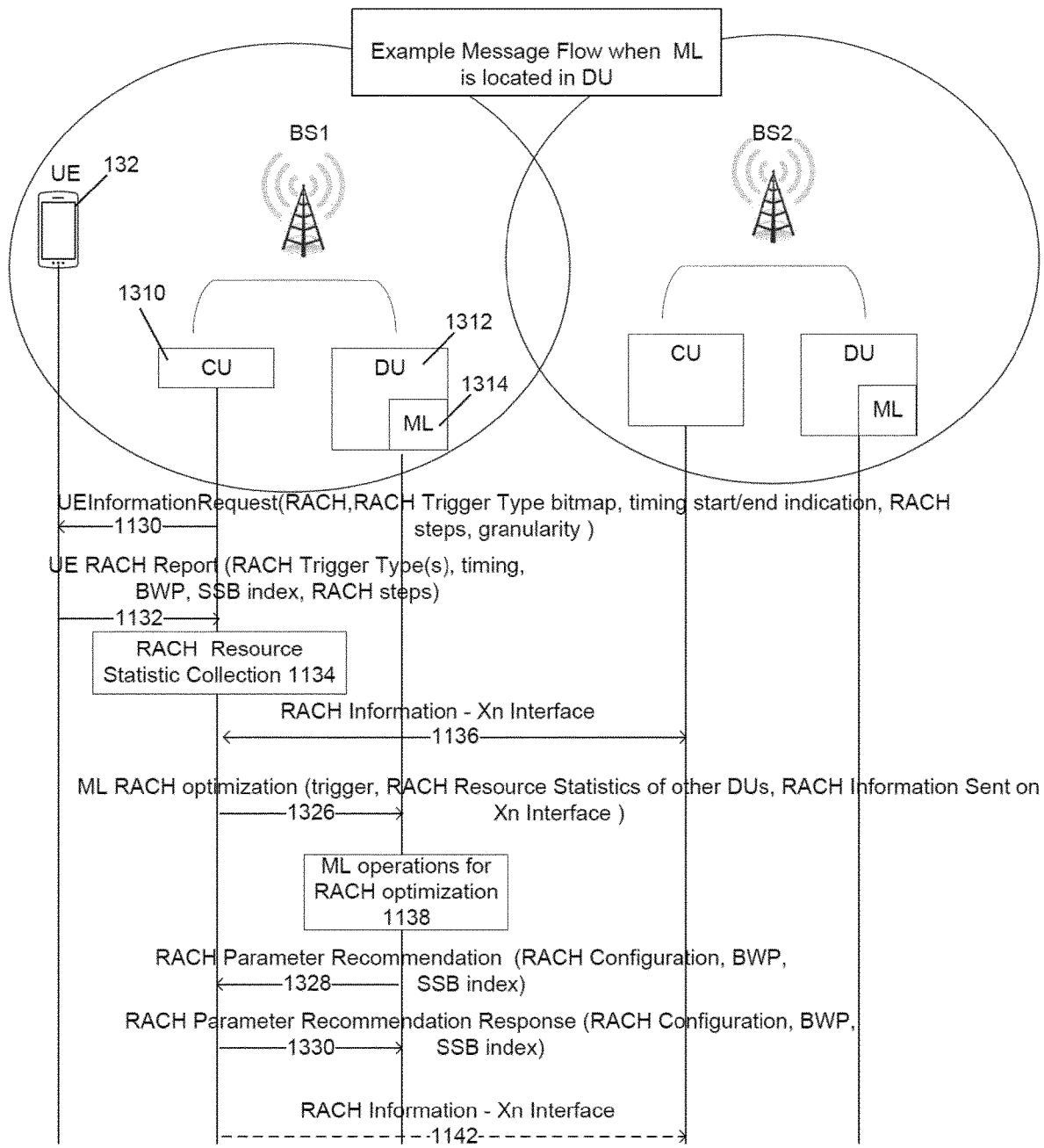
FIG. 13 is a diagram illustrating a message flow when a machine learning (ML) algorithm for RACH optimization is provided in a distributed unit (DU) in the case of a split base station according to an example embodiment.

FIG. 13 is a diagram illustrating a message flow when a machine learning (ML) algorithm for RACH optimization is provided in a distributed unit (DU) in the case of a split base station according to an example embodiment. A UE 132 is in communication with a BS1. BS1 includes a CU 1310 and a DU 1312. DU 1312 includes a machine learning (ML) algorithm 1314 for RACH optimization (e.g., where ML algorithm 1314 for RACH optimization may include a RACH optimization coordinator and a ML submodule for each of one or more RACH trigger types, or other configuration). At 1130, CU 1310 requests RACH measurements (RACH information) from the UE with UEInformationRequest (where the RACH information request may indicate, e.g., one or more of a RACH trigger type map to identify one or more RACH trigger types for which RACH information is requested, a logging time indication to indicate a time for which RACH information is requested, a RAH steps indication (e.g., indicating whether 2 step and/or 4 step RACH procedure information is being requested), a granularity indication to indicate whether a normal RACH report or an extended RACH report is requested). At 1132, UE 132 responds with the RACH report of measurements according to the parameters indicated in the request. At 1134, CU 1310 may perform a RACH Resource Statistic Collection (e.g., see FIG. 11 and/or FIG. 12 for an example description). In brief, it involves requesting by the CU 1310 information available at the DUs (to be used in the ML algorithm at the CU). At 1136, CU 1310 obtains through the Xn Interface RACH information of neighbouring BSs (or from the CU part of those BSs) and also communicates to neighbouring BSs its own RACH Information. After receiving both the RACH report (at 1132) and the information through the Xn interface (e.g., at 1134 and/or 1136), at 1326, the CU 1310 may trigger (or perform, or cause to perform) the ML RACH optimization (1138, e.g., see example description with reference to FIG. 11) at the DU by ML algorithm 1314 with a set of received RACH information or RACH parameters. ML algorithm 1314 may optimize RACH parameters (or RACH resource allocations), e.g., based on the RACH resource statistics of other DUs, a UE RACH report(s), and/or RACH Information it has received through the Xn interface.

In an example embodiment, with reference to FIG. 13, the relationship between CU 1310 and DU 1312 may be a "master" and "slave" relationship (with CU being master, and DU being the slave). Thus, after ML algorithm 1314 at DU 1312 determines a set of (e.g., optimum) new or adjusted RACH parameters or resource allocations (e.g., RACH configuration, BWP, SSB index, . . . ), at 1328, DU 1312 may send these new or adjusted RACH parameters or resource allocations as a recommended set of RACH parameters to CU 1310. Multiple DUs (running different ML algorithms) may send different RACH parameter recommendations to the CU 1310. At 1330, CU 1310 may confirm the recommended RACH parameters, or may send back a different set of new/adjusted RACH parameters to be used to the DU 1312. Thus, while DU 1312 may provide a set of recommended RACH parameters, the CU 1310 may decide the RACH parameters to be used. Thus, in this example embodiment, the CU 1310 may be the entity deciding the RACH related parameters that different DUs should operate on upon receiving different recommendations. At 1142, CU 1310 may further communicate through the Xn interface to the other CUs RACH related parameters. In an example embodiment, to reduce Xn signalling a BS may send its optimized "RACH Information over the Xn" only when its neighbours request it and only to those neighbours.

Figure 14:
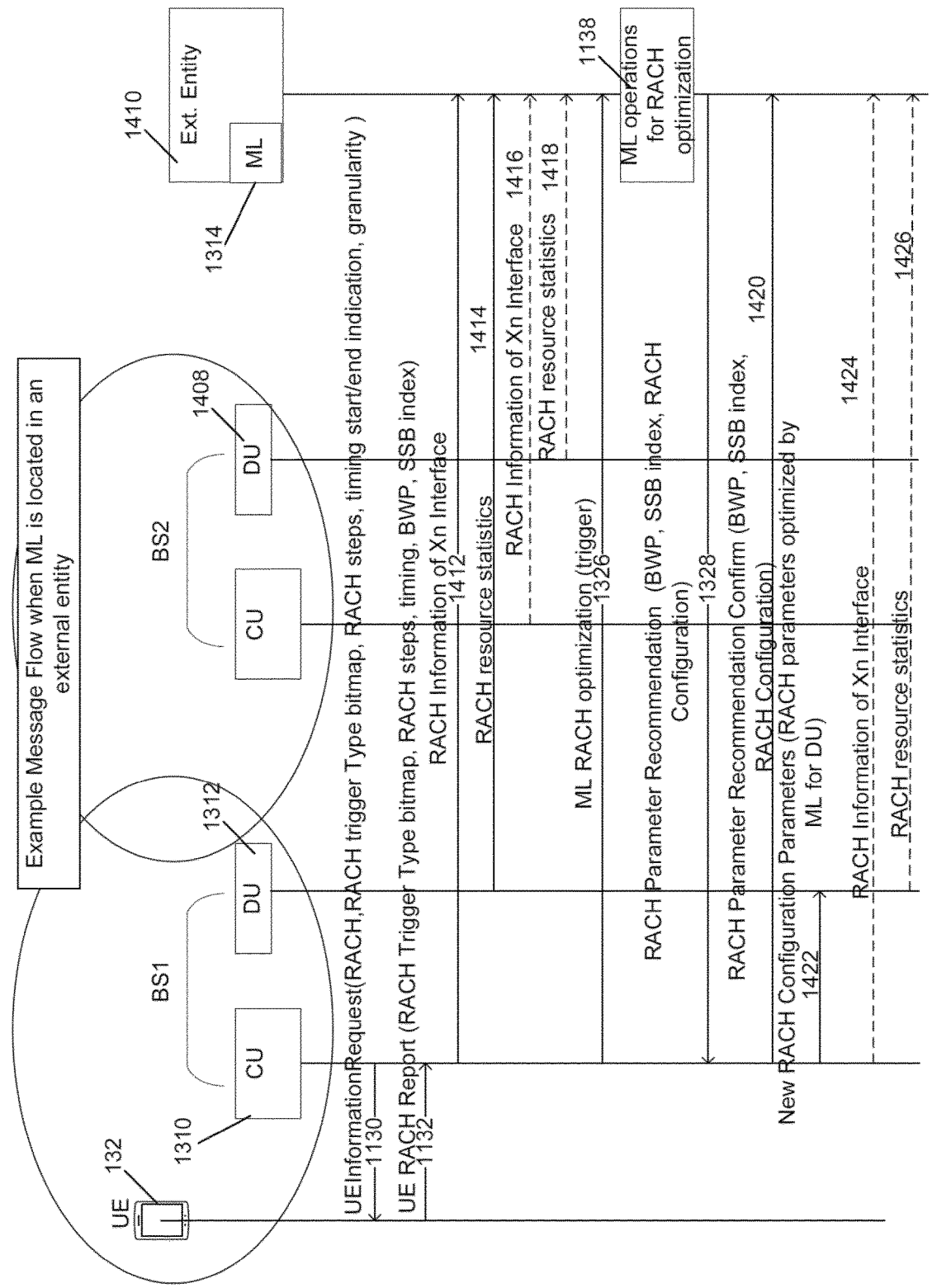
FIG. 14 is a diagram illustrating a message flow when a machine learning (ML) algorithm for RACH optimization is provided in an external entity according to an example embodiment.

FIG. 14 is a diagram illustrating a message flow when a machine learning (ML) algorithm for RACH optimization is provided in an external entity according to an example embodiment. In this example embodiment, the ML algorithm 1314 may be located at an external entity 1410, e.g., such as a cloud-based device (e.g., running on a server in the cloud), running on a RAN (radio access network) intelligent controller (RIC), or other entity or location. The timing diagram of FIG. 14 may be somewhat similar to the diagrams of FIGS. 11 and 13, with the main difference that additional messages may be sent between the CU and/or DU and the externally located ML algorithm 1314. At 1130, the CU 1310 requests RACH measurements (RACH information) from the UE 132 with UEInformationRequest. At 1132, UE 132 responds with the RACH report of measurements or RACH information according to the parameters indicated in the request. Information from CU 1310 and all DUs (including from DU 1312 of BS1 and DU 1408 of BS2) is sent to the external entity 1410 where the ML algorithm 1314 is located, e.g., see messages 1412, 1414, 1416 and/or 1418, as examples. For instance, in the case of RIC, the available interfaces between CU↔RIC and DU↔RIC can be used for communication of those parameters. After receiving both the UE RACH report and the RACH information through the Xn interface (also from possibly other CUs and DUs), the external entity 1410 where ML algorithm 1314 resides can perform its ML RACH optimization algorithm. The optimal ML RACH solution (e.g., which may be a set of adjusted or new RACH parameters and/or allocation of resources) is then signalled at 1328 to the CU 1310, which is responsible to signal those parameters to its DUs (via messages at 1422 and 1424). CU 1310 may also send a message at 1420 to external entity 1410 to confirm (or modify) the recommended RACH parameters. At 1426, RACH resource statistics may be sent by DU 1312 to external entity 1410.

Alternatively, a different solution may be provided, e.g., in which the RACH optimization coordinator is the one requesting reporting by the UEs (instead of the ML submodules requesting the reports). Once RACH optimization coordinator receives RACH reports (including RACH information for different RACH trigger types) for different RACH trigger types, the RACH optimization coordinator may forward the received RACH information to the corresponding trigger-specific ML submodule(s).

Also, in an example embodiment, RACH optimization coordinators at different BSs may exchange with each other the average cost computed at the RACH optimization coordinator (e.g., averaged over all trigger-specific submodules). This information can be used at the RACH optimization coordinator to better optimize RACH performance. For example, knowing the average cost of RACH optimization algorithms in neighbouring cells can be used by a BS to try to uniformize or equalize (or make more uniform or more equal) its performance (to obtain a cost more similar or more equal to the cost that its neighbour coordinator calculated).

A possible example ASN1 implementation is as follows:

```
UEInformationRequest-r16-IEs ::=        SEQUENCE {
        rach-ReportReq-r9               BOOLEAN,
        rach-ReportGranularity          {extended, normal}
        rlf-ReportReq-r9                BOOLEAN,
        nonCriticalExtension            SEQUENCE { }       OPTIONAL
}
rach-Report-list-rl6    SEQUENCE (SIZE 1..200) OF Rach-Report-r16
Rach-Report-r16 ::= SEQUENCE {
        cell-ID                 INTEGER,
        rach resource identifier        INTEGER,
        reason-for-RACH         ENUMERATED {sI-request, bfr, rrc-connection,...}
        numberOfPreamblesSent-r9        NumberOfPreamblesSent-r11,
        contentionDetected-r9           BOOLEAN
}
        (where reason-for-RACH refers to the RACH trigger type)
```

According to an example embodiment, as noted above, a machine learning (ML) algorithm may be used for RACH optimization (RACH improvement). For example, a ML submodule may be provided for each of multiple RACH trigger types. According to an example embodiment, at least in some cases, a ML algorithm may also be referred to as an artificial intelligence (AI) neural network, a neural network model, an AI neural network model, an AI model, a machine learning (ML) model or algorithm, or other term to perform RACH optimization. According to an example embodiment, neural networks may be or may include computational models used in machine learning made up of nodes organized in layers. The nodes are also referred to as artificial neurons, or simply neurons, and perform a function on provided input to produce some output value. A neural network may require a training period to learn the parameters, i.e., weights, used to map the input to a desired output. The mapping occurs via the function. Thus, the weights are weights for the mapping function of the neural network. Each AI model or neural network may be trained for a specific task (e.g., such as RACH optimization, or determining a trigger-specific RACH cost).

To provide the output given the input, the neural network should be trained, which may involve learning the proper value for a large number of parameters for the mapping function. The parameters are also commonly referred to as weights as they are used to weight terms in the mapping function. This training may be an iterative process, with the values of the weights being tweaked over thousands of rounds of training until arriving at the optimal, or most accurate, values. In the context of neural networks, the parameters may be initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

According to an example embodiment, neural networks can be trained in either a supervised or unsupervised manner. In supervised learning, training examples are provided to the neural network or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the machine learning model learns to identify a structure or pattern in the provided input. In other words, the model identifies implicit relationships in the data. Unsupervised learning is used in many machine learning problems and typically requires a large set of unlabeled data.

According to an example embodiment, the learning or training of a neural network model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also has to optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there is no specific way to compare model performance in most unsupervised learning methods.

Figure 15:
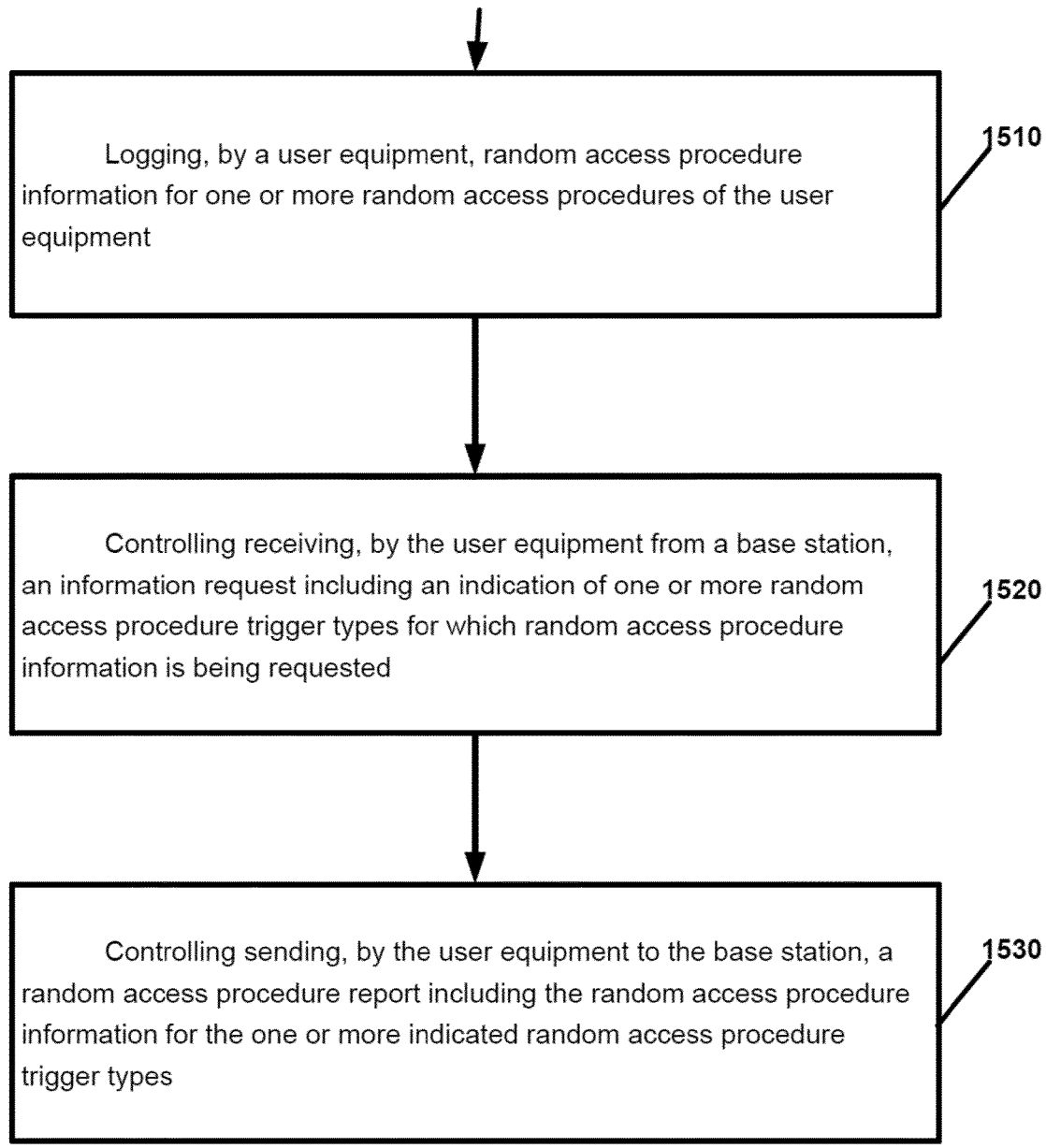
FIG. 15 is a flow chart illustrating operation of a user equipment according to an example embodiment.

Example 1. FIG. 15 is a flow chart illustrating operation of a user equipment according to an example embodiment. Operation 1510 includes logging, by a user equipment, random access procedure information for one or more random access procedures of the user equipment. Illustrative examples of operation 1510 may include operation 2 of FIG. 7, operation 5 of FIG. 8, and operation 4 of FIG. 9.

Operation 1520 includes controlling receiving, by the user equipment from a base station, an information request including an indication of one or more random access procedure trigger types for which random access procedure information is being requested. Illustrative examples of operation 1520 may include operation 320 of FIG. 3, operation 4 of FIG. 7, operation 1130 of FIGS. 11, 13 and 14.

And, operation 1530 includes controlling sending, by the user equipment to the base station, a random access procedure report including the random access procedure information for the one or more indicated random access procedure trigger types. Illustrative examples of operation 1530 may include operation 322 of FIG. 3, RACH reports sent by UE1, UE2 and UE3 of FIG. 4, operation 5 of FIG. 7, operation 2 of FIG. 10, and operation 1132 of FIGS. 11, 13 and 14. See also operation 6 of FIG. 8 and operation 5 of FIG. 9 (UE logged information is retrieved from UE by the BS).

Example 2. The method of example 1, wherein the controlling receiving comprises: controlling receiving, by the user equipment from the base station, the information request including a bitmap that indicates one or more random access procedure trigger types for which random access procedure information is being requested. Illustrative examples of this operation, including use of a bitmap, may include: operation 320 ("Information request for RACH information (trigger type bitmap)") of FIG. 3; operation 1130 (UE Information Request, including a RACH trigger type bitmap) of FIGS. 11, 13 and 14.

Example 3. The method of any of claims 1-2, further comprising: performing, or attempting to perform, one or more random access procedures (illustrative examples of this operation may include operation 316 of FIG. 3; operation 1 of FIG. 7; operation 2 of FIG. 8; operation 3 of FIG. 9; operation 1 of FIG. 10); and controlling sending, by the user equipment to the base station, a random access procedure information availability indicator that indicates that the user equipment has logged the random access procedure information (illustrative examples of this operation may include operation 318 of FIG. 3; and, operation 3 of FIG. 7); wherein the controlling receiving comprises controlling receiving, by the user equipment from the base station in response to the random access procedure information availability indicator.

Example 4. The method of example 3 wherein the random access procedure information availability indicator includes an indication of one or more random access procedure trigger types for which random access procedure information has been logged and is available. As an illustrative example of this operation, operation 3 of FIG. 7 includes a RACH report availability indicator (including a bitmap identifying RACH trigger type(s) for which RACH information is available).

Example 5. The method of any of examples 1-4, further comprising: receiving, by the user equipment, one or more updated random access procedure parameters, based at least in part, on a random access procedure report including the random access procedure information sent by the user equipment to the base station. An illustrative example of this operation may include operation 323 of FIG. 3.

Example 6. The method of any of examples 1-5, further comprising: receiving, by the user equipment from the base station, a logging time indication that indicates a time the user equipment should begin logging (an example of this operation includes operation 314 of FIG. 3; operation 1 of FIG. 8); and wherein the logging comprises logging, by the user equipment, random access procedure information for one or more random access procedures of the user equipment beginning at the time indicated by the logging time indication (an example of this operation includes operation 5 of FIG. 8).

Example 7. The method of any of examples 1-6, wherein the controlling sending a random access procedure report including the random access procedure information is triggered by location-based information at the user equipment. As described with reference to operation 322 of FIG. 3, the UE may send the RACH procedure report at 322 when UE has a specific GPS (Global Positioning System) coordinate or location (or within a range of locations), when the UE is within a specific serving cell, the UE is within a specific tracking area (TA), or when the UE is within a specific RAN notification area, etc. Thus, location-based information may include various location-based information base on a cell, a tracking area or a RAN notification area, or GPS coordinate, as examples.

Example 8. The method of any of examples 1-7, further comprising: controlling sending, by the user equipment to the base station, an extended report ability of the user equipment to send the base station extended random access procedure information for use in a random access procedure optimization process, wherein the extended random access procedure information includes information for more random access procedure parameters and/or information for more random access procedures as compared to a normal random access procedure information.

Example 9. The method of any of examples 1-8, wherein the logging comprises: creating a log, by a user equipment, of random access procedure information, for each of one or more random access procedure trigger types. As an illustrative example of this operation, with respect to FIG. 3, RACH information stored in RACH information log 312 may include, for example, creating a log of RACH procedure information for each of one or more RACH procedure trigger types. Examples also include operation 2 of FIG. 7 and operation 5 of FIG. 8.

Example 10. The method of any of examples 1-9 wherein each of the random access procedure trigger types comprises one or more of the following trigger types for a random access procedure: initial access to a cell from a radio resource control (RRC) Idle mode, a radio resource control (RRC) re-establishment procedure, a handover of the user equipment, a downlink or uplink data arrival at the user equipment during a radio resource control (RRC) Connected mode when uplink synchronization status of the user equipment is non-synchronized, an uplink data arrival at the user equipment during a radio resource control (RRC) Connected mode when there are no uplink control channel resources available to send a scheduling request to a cell a, a scheduling request failure, a network request by a radio resource control (RRC) entity upon synchronous reconfiguration, a transition from a radio resource control (RRC) Inactive mode, an establishment of time alignment at a secondary cell (SCell) addition, a request of other system information (SI), or a beam failure recovery.

Example 11. The method of any of examples 1-10, wherein the random access procedure report including the random access procedure information, which is logged and/or sent to the base station, comprises one or more of the following for each of one or more random access procedures of the user equipment: the random access procedure trigger type, which triggers the random access procedure; a number of steps, either 2 steps or 4 steps, for the random access procedure; a resource used for the random access procedure, including one or more of: a bandwidth part index for a bandwidth part, a frequency, a synchronization signaling block (SSB) index, and timing information; a number of random access preambles sent by the user equipment until a successful random access procedure completion; or one or more random access procedure configuration indexes used by the user equipment until a successful random access procedure completion.

Example 12. An apparatus comprising means (e.g., 1800, 1802A/1802B, 1804, 1808 and/or 1806, FIG. 18) for performing the method of any of examples 1-11.

Example 13. A non-transitory computer-readable storage medium comprising instructions stored thereon that, when executed by at least one processor, are configured to cause a computing system to perform the method of any of examples 1-11.

Example 14. An apparatus comprising: at least one processor (e.g., 1804 and/or 1808, FIG. 18); and at least one memory (e.g., 1806, FIG. 18) including computer program code;
the at least one memory and the computer program code configured to, with the at least one processor, cause the apparatus at least to perform the method of any of examples 1-11.

Figure 16:
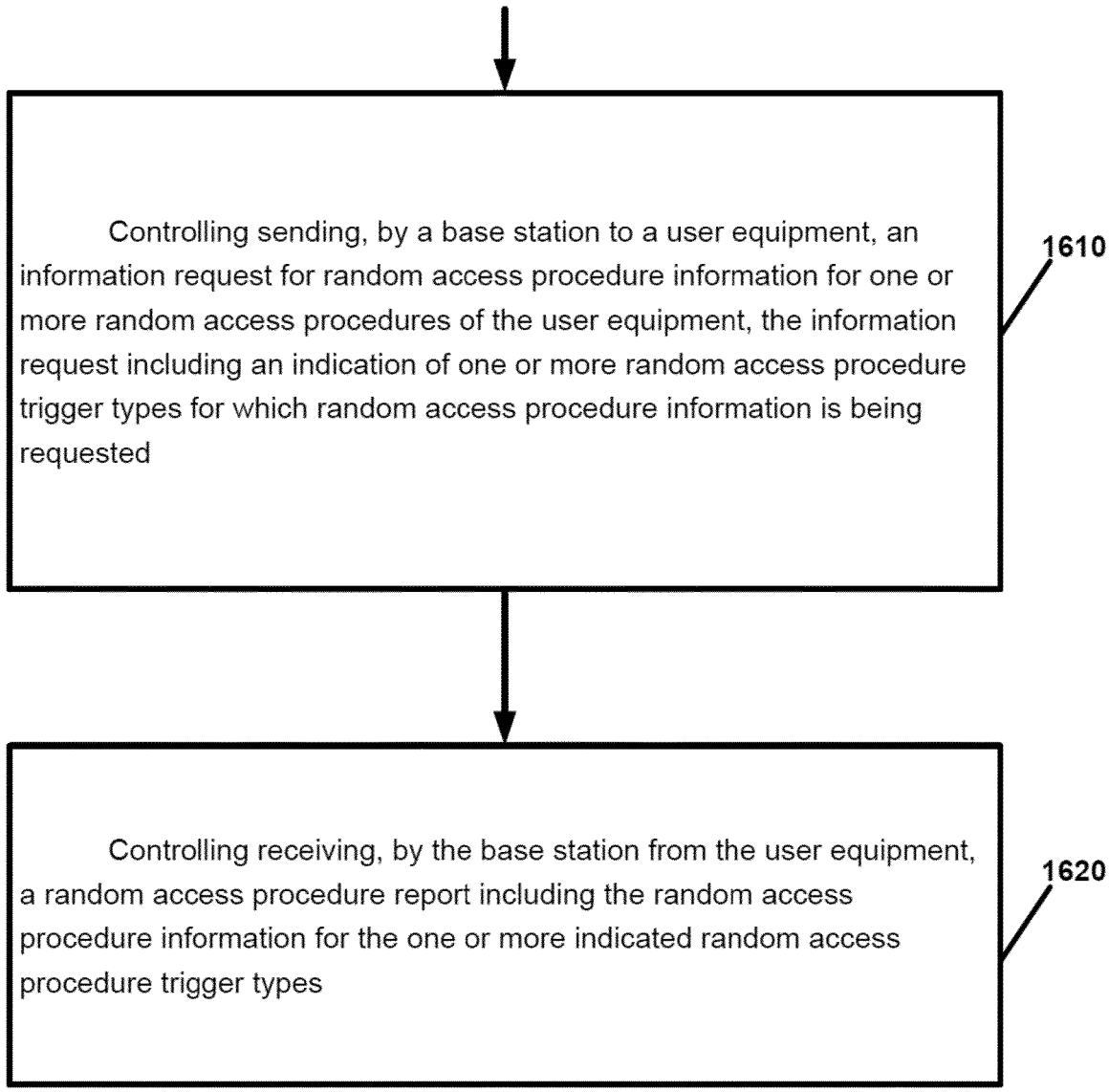
FIG. 16 is a flow chart illustrating operation of a base station according to an example embodiment.

Example 15. FIG. 16 is a flow chart illustrating operation of a user equipment according to an example embodiment. Operation 1610 includes controlling sending, by a base station to a user equipment, an information request for random access procedure information for one or more random access procedures of the user equipment, the information request including an indication of one or more random access procedure trigger types for which random access procedure information is being requested. Illustrative examples of operation 1610 may include operation 320 of FIG. 3, operation 4 of FIG. 7, operation 1130 of FIGS. 11, 13 and 14.

And, operation 1620 includes controlling receiving, by the base station from the user equipment, a random access procedure report including the random access procedure information for the one or more indicated random access procedure trigger types. Illustrative examples of operation 1620 may include operation 322 of FIG. 3, RACH reports sent by UE1, UE2 and UE3 of FIG. 4, operation 5 of FIG. 7, operation 2 of FIG. 10, and operation 1132 of FIGS. 11, 13 and 14. See also operation 6 of FIG. 8 and operation 5 of FIG. 9 (UE logged information is retrieved from UE by the BS).

Example 16. The method of example 15, wherein the information request comprises a bitmap that indicates one or more random access procedure trigger types for which random access procedure information is being requested. Illustrative examples of this operation, including use of a bitmap, may include: operation 320 ("Information request for RACH information (trigger type bitmap)") of FIG. 3; operation 1130 (UE Information Request, including a RACH trigger type bitmap) of FIGS. 11, 13 and 14.

Example 17. The method of any of examples 15-16, further comprising: controlling receiving, by the base station from the user equipment, a random access procedure information availability indicator that indicates that the user equipment has logged the random access procedure information (illustrative examples of this operation may include operation 318 of FIG. 3; and, operation 3 of FIG. 7); wherein the controlling sending comprises controlling sending, by the base station, the information request in response to the random access procedure information availability indicator.

Example 18. The method of example 17 wherein the random access procedure information availability indicator includes an indication of one or more random access procedure trigger types for which random access procedure information has been logged and is available. As an illustrative example of this operation, operation 3 of FIG. 7 includes a RACH report availability indicator (including a bitmap identifying RACH trigger type(s) for which RACH information is available).

Example 19. The method of any of examples 15-18, further comprising: sending, by the base station to the user equipment, a logging time indication that indicates a time the user equipment should begin logging of random access procedure information. An example of this operation includes operation 314 of FIG. 3; operation 1 (logging configuration may include a logging time) of FIG. 8.

Example 20. The method of any of examples 15-19, further comprising: controlling receiving, by the base station from the user equipment, an extended report ability of the user equipment to send the base station extended random access procedure information for use in a random access procedure optimization process, wherein the extended random access procedure information includes information for more random access procedure parameters and/or information for more random access procedures as compared to a normal random access procedure information.

Example 21. The method of any of examples 15-20 wherein each random access procedure trigger type comprises one or more of the following trigger types for a random access procedure: an initial access to a cell from a radio resource control (RRC) Idle mode, a radio resource control (RRC) re-establishment procedure, a handover of the user equipment, a downlink or uplink data arrival at the user equipment during a radio resource control (RRC) Connected mode when uplink synchronization status of the user equipment is non-synchronized, an uplink data arrival at the user equipment during a radio resource control (RRC) Connected mode when there are no uplink control channel resources available to send a scheduling request to a cell a, a scheduling request failure, a network request by a radio resource control (RRC) entity upon synchronous reconfiguration, a transition from a radio resource control (RRC) Inactive mode, an establishment of time alignment at a secondary cell (SCell) addition, a request of other system information (SI), or a beam failure recovery.

Example 22. The method of any of examples 15-21, wherein a random access procedure report including the random access procedure information, which is received by the base station, comprises one or more of the following for each of one or more random access procedures of the user equipment: the random access procedure trigger type, which triggers the random access procedure; a number of steps, either 2 steps or 4 steps, for the random access procedure; a resource used for the random access procedure, including one or more of: a bandwidth part index for a bandwidth part, a frequency, a synchronization signaling block (SSB) index, and timing information; a number of random access preambles sent by the user equipment until a successful random access procedure completion; or one or more random access procedure configuration indexes used by the user equipment until a successful random access procedure completion.

Example 23. The method of any of examples 15-22, further comprising: controlling receiving, by the base station from one or more other base stations, base station-communicated random access procedure information based on random access procedures performed by one or more user equipment. Illustrative examples of this operation may include operation 339 of FIG. 3; Parameters through Xn interface (from BS2, BS3, BSG) of FIG. 4; Xn information from 610, 612 and 614 of FIG. 6; operations 3 and 4 of FIG. 10; operations 1136 and 1142 of FIGS. 11, 13 and 14.

Example 24. The method of example 23, further comprising: determining, by the base station based on at least one of the random access procedure report received from the user equipment or the base-station communicated random access procedure information, cost information including a random access procedure cost for each of one or more of the random access procedure trigger types (examples of this operation may include ML submodule (330, as an example) for RACH trigger type 1 (330, FIGS. 3 and 6) determines RACH cost; ML operations for RACH optimization 338 of FIGS. 11, 13 and 14); and, adjusting, by the base station based on the cost information, one or more random access procedure parameters or allocation of resources, for at least one of the plurality of random access procedure trigger types (an example of this operation may include operation 336 of FIG. 3, performed by RACH optimization coordinator 334).

Example 25. The method of example 24, wherein the cost information comprises an average random access procedure cost for each of one or more of the random access procedure trigger types.

Example 26. The method of any of examples 24-25, wherein the cost information comprises a weighted random access procedure cost for each of one or more of the random access procedure trigger types, where a weight, based on a relative priority of the random access procedure trigger type, is applied to a base random access procedure cost to obtain the weighted random access procedure cost for the trigger type.

Example 27. The method of any of examples 24-26, wherein the random access procedure cost, per each of one or more of the random access procedure trigger types, comprises an average number of random access preamble transmissions required to achieve random access procedure success.

Example 28. The method of any of examples 15-27, wherein the base station comprises at least one of a centralized unit (CU) and/or one or more distributed units (DUs) in the case of a split base station. Illustrative examples of a split BS are shown in FIGS. 11-14.

Example 29. An apparatus comprising means (e.g., 1800, 1802A/1802B, 1804, 1808 and/or 1806, FIG. 18) for performing the method of any of examples 15-28.

Example 30. A non-transitory computer-readable storage medium comprising instructions stored thereon that, when executed by at least one processor, are configured to cause a computing system to perform the method of any of examples 15-28.

Example 31. An apparatus comprising: at least one processor (e.g., 1804 and/or 1808, FIG. 18); and at least one memory (e.g., 1806, FIG. 18) including computer program code; the at least one memory and the computer program code configured to, with the at least one processor, cause the apparatus at least to perform the method of any of examples 15-28.

Figure 17:
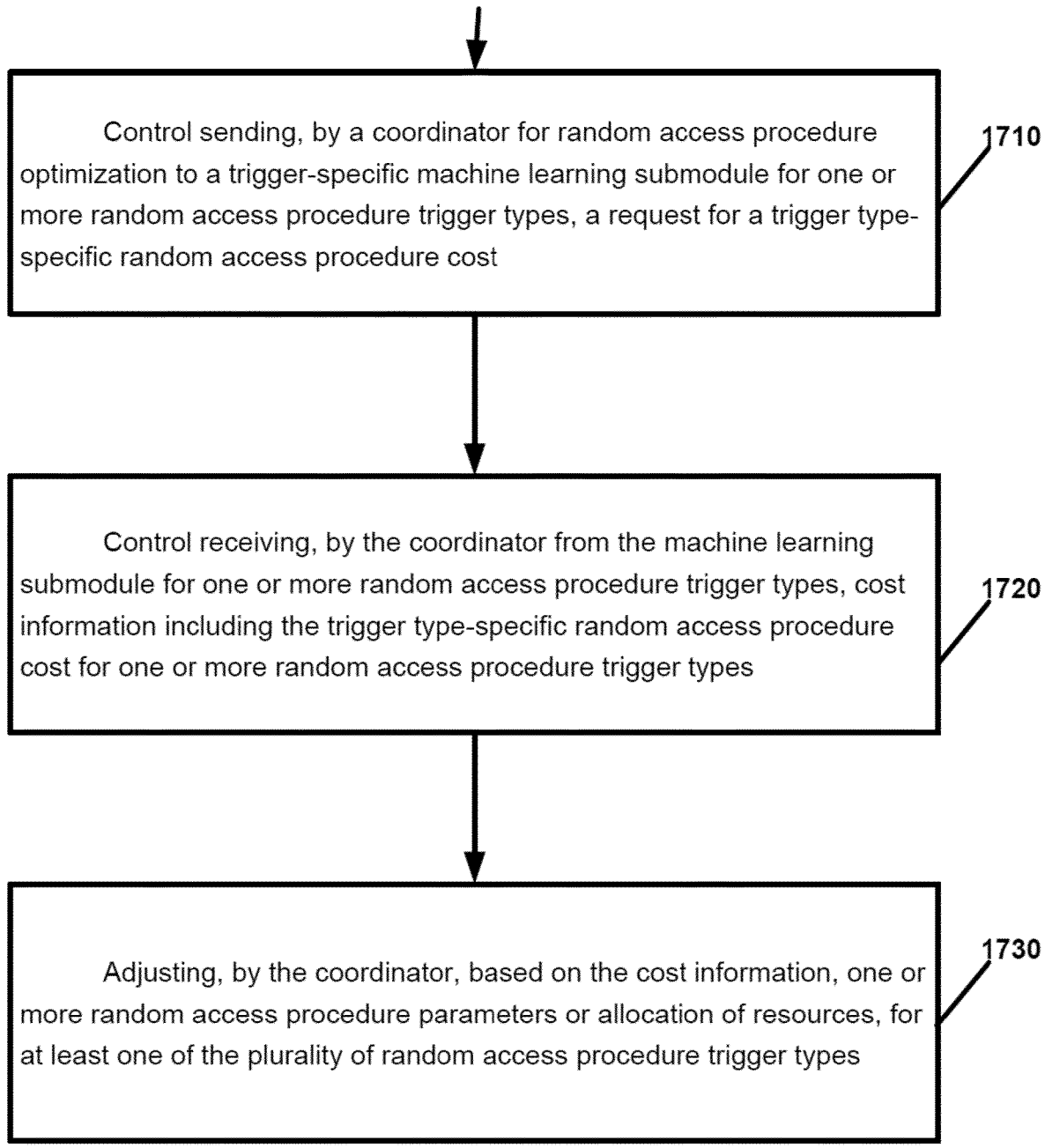
FIG. 17 is a flow chart illustrating operation of coordinator for random access procedure optimization according to an example embodiment.

Example 32. FIG. 17 is a flow chart illustrating operation of coordinator for random access procedure optimization according to an example embodiment. Operation 1710 includes control sending, by a coordinator for random access procedure optimization to a trigger-specific machine learning submodule for one or more random access procedure trigger types, a request for a trigger type-specific random access procedure cost (examples of this operation include: operation 340 (request for cost) sent by RACH optimization coordinator 334 (FIG. 3) to ML submodule (330) for RACH trigger type 1); operation (1) (622) of FIG. 6 (trigger RACH trigger type 1 optimization sent by RACH optimization coordinator 334 to ML submodule 330 in FIG. 6).

Operation 1720 includes control receiving, by the coordinator from the machine learning submodule for one or more random access procedure trigger types, cost information including the trigger type-specific random access procedure cost for one or more random access procedure trigger types (examples of this operation include operation 342 (RACH cost) received by RACH optimization coordinator 334 from ML submodule for RACH trigger type 1 (330) of FIG. 3; and operation (2) (average cost for trigger type 1) of FIG. 6, received by RACH optimization coordinator 334 from ML submodule 330 for RACH trigger type 1 (other ML submodules for other trigger types (trigger type 2, ... trigger type k), perform same/similar operations as ML submodule for trigger type 1, see FIG. 6).

Operation 1730 includes adjusting, by the coordinator, based on the cost information, one or more random access procedure parameters or allocation of resources, for at least one of the plurality of random access procedure trigger types. An illustrative example of this operation may include operation 336 of FIG. 3, performed by RACH optimization coordinator 334. See FIGS. 3 and 6.

Example 33. The method of example 32, further comprising: controlling sending, by the coordinator to the trigger-specific machine learning submodule for one or more random access procedure trigger types, information indicating the one or more adjusted random access procedure parameters or adjusted allocation of resources. An illustrative example of this operation includes: operation 344 of FIG. 3 (updated RACH parameters) sent by RACH optimization coordinator (334) to ML submodule for RACH trigger type 1 (330); and, operation (3) (624) of FIG. 6 (RACH trigger type 1 parameter update sent by RACH optimization coordinator 334 to ML submodule (RACH optimization) for RACH trigger type 1; similar operations performed for other ML submodules for other trigger types, see other operations (3) for other trigger types in FIG. 6);

Example 34. The method of any of examples 32-33, wherein the cost information comprises an average random access procedure cost for each of one or more of the random access procedure trigger types.

Example 35. The method of any of examples 32-34, wherein the cost information comprises a weighted random access procedure cost for each of one or more of the random access procedure trigger types, wherein a weight, based on a relative priority of the random access procedure trigger type, is applied to a base random access procedure cost to obtain the weighted random access procedure cost for the trigger type.

Example 36. The method of any of examples 32-35, wherein the random access procedure cost, per each of one or more of the random access procedure trigger types, comprises an average number of random access preamble transmissions required to achieve random access procedure success.

Example 37. An apparatus comprising means (e.g., 1800, 1802A/1802B, 1804, 1808 and/or 1806, FIG. 18) for performing the method of any of examples 32-36.

Example 38. A non-transitory computer-readable storage medium comprising instructions stored thereon that, when executed by at least one processor, are configured to cause a computing system to perform the method of any of examples 32-36.

Example 39. An apparatus comprising: at least one processor (e.g., 1804 and/or 1808, FIG. 18); and at least one memory (e.g., 1806, FIG. 18) including computer program code;

the at least one memory and the computer program code configured to, with the at least one processor, cause the apparatus at least to perform the method of any of examples 32-36.

Figure 18:
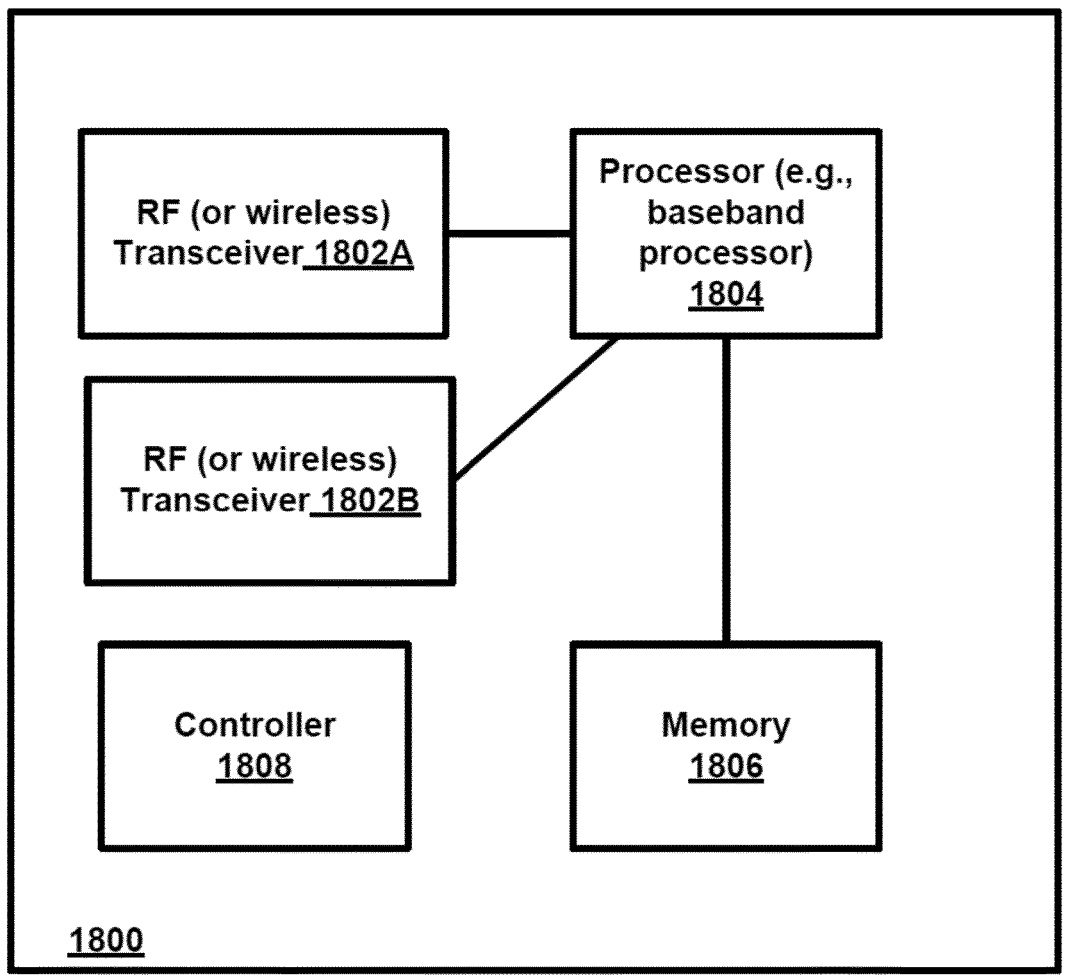
FIG. 18 is a block diagram of a wireless station (e.g., AP, BS, RAN node, UE or user device, or other network node) according to an example embodiment.

FIG. 18 is a block diagram of a wireless station (e.g., AP, BS or user device/UE, or other network node) 1800 according to an example embodiment. The wireless station 1800 may include, for example, one or more (e.g., two as shown in FIG. 18) RF (radio frequency) or wireless transceivers 1802A, 1802B, where each wireless transceiver includes a transmitter to transmit signals and a receiver to receive signals. The wireless station also includes a processor or control unit/entity (controller) 1804 to execute instructions or software and control transmission and receptions of signals, and a memory 1806 to store data and/or instructions.

Processor 1804 may also make decisions or determinations, generate frames, packets or messages for transmission, decode received frames or messages for further processing, and other tasks or functions described herein. Processor 1804, which may be a baseband processor, for example, may generate messages, packets, frames or other signals for transmission via wireless transceiver 1802 (1802A or 1802B). Processor 1804 may control transmission of signals or messages over a wireless network, and may control the reception of signals or messages, etc., via a wireless network (e.g., after being down-converted by wireless transceiver 1802, for example). Processor 1804 may be programmable and capable of executing software or other instructions stored in memory or on other computer media to perform the various tasks and functions described above, such as one or more of the tasks or methods described above. Processor 1804 may be (or may include), for example, hardware, programmable logic, a programmable processor that executes software or firmware, and/or any combination of these. Using other terminology, processor 1804 and transceiver 1802 together may be considered as a wireless transmitter/receiver system, for example.

In addition, referring to FIG. 18, a controller (or processor) 1808 may execute software and instructions, and may provide overall control for the station 1800, and may provide control for other systems not shown in FIG. 18, such as controlling input/output devices (e.g., display, keypad), and/or may execute software for one or more applications that may be provided on wireless station 1800, such as, for example, an email program, audio/video applications, a word processor, a Voice over IP application, or other application or software.

In addition, a storage medium may be provided that includes stored instructions, which when executed by a controller or processor may result in the processor 1804, or other controller or processor, performing one or more of the functions or tasks described above.

According to another example embodiment, RF or wireless transceiver(s) 1802A/1802B may receive signals or data and/or transmit or send signals or data. Processor 1804 (and possibly transceivers 1802A/1802B) may control the RF or wireless transceiver 1802A or 1802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method comprising:
logging, by a user equipment, random access procedure information for one or more random access procedures of the user equipment;
controlling receiving, by the user equipment from a base station, an information request including an indication of one or more random access procedure trigger types for which random access procedure information is being requested; and
controlling sending, by the user equipment to the base station, a random access procedure report including the random access procedure information for the one or more indicated random access procedure trigger types.

2. The method of claim 1, wherein the controlling receiving comprises:
controlling receiving, by the user equipment from the base station, the information request including a bitmap that indicates one or more random access procedure trigger types for which random access procedure information is being requested.

3. The method of claim 1, further comprising:
performing, or attempting to perform, one or more random access procedures; and
controlling sending, by the user equipment to the base station, a random access procedure information availability indicator that indicates that the user equipment has logged the random access procedure information;
wherein the controlling receiving comprises controlling receiving, by the user equipment from the base station in response to the random access procedure information availability indicator.

4. The method of any of claim 1, wherein the controlling sending a random access procedure report including the random access procedure information is triggered by location-based information at the user equipment.

5. The method of any of claim 1, further comprising:
controlling sending, by the user equipment to the base station, an extended report ability of the user equipment to send the base station extended random access procedure information for use in a random access procedure optimization process, wherein the extended random access procedure information includes information for more random access procedure parameters and/or information for more random access procedures as compared to a normal random access procedure information.

6. The method of claim 1, wherein the logging comprises:
creating a log, by a user equipment, of random access procedure information, for each of one or more random access procedure trigger types.

7. An apparatus comprising:
at least one processor; and
at least one memory including computer program code;
the at least one memory and the computer program code configured to, with the at least one processor, cause the apparatus at least to
log, by a user equipment, random access procedure information for one or more random access procedures of the user equipment;
control receiving, by the user equipment from a base station, an information request including an indication of one or more random access procedure trigger types for which random access procedure information is being requested; and
control sending, by the user equipment to the base station, a random access procedure report including the random access procedure information for the one or more indicated random access procedure trigger types.

8. The apparatus of claim 7, wherein the controlling receiving comprises:
control receiving, by the user equipment from the base station, the information request including a bitmap that indicates one or more random access procedure trigger types for which random access procedure information is being requested.

9. The apparatus of claim 7, further comprising:
perform, or attempting to perform, one or more random access procedures; and
controlling sending, by the user equipment to the base station, a random access procedure information availability indicator that indicates that the user equipment has logged the random access procedure information;
wherein the controlling receiving comprises controlling receiving, by the user equipment from the base station in response to the random access procedure information availability indicator.

10. The method of any of claim 7, wherein the controlling sending a random access procedure report including the random access procedure information is triggered by location-based information at the user equipment.

11. The method of claim 7, further comprising:
controlling sending, by the user equipment to the base station, an extended report ability of the user equipment to send the base station extended random access procedure information for use in a random access procedure optimization process, wherein the extended random access procedure information includes information for more random access procedure parameters and/or information for more random access procedures as compared to a normal random access procedure information.

12. The method of any of claim 7, wherein the logging comprises:
creating a log, by a user equipment, of random access procedure information, for each of one or more random access procedure trigger types.

13. A method comprising:
controlling sending, by a base station to a user equipment, an information request for random access procedure information for one or more random access procedures of the user equipment, the information request including an indication of one or more random access procedure trigger types for which random access procedure information is being requested; and
controlling receiving, by the base station from the user equipment, a random access procedure report including the random access procedure information for the one or more indicated random access procedure trigger types.

14. The method of claim 13, wherein the information request comprises a bitmap that indicates one or more random access procedure trigger types for which random access procedure information is being requested.

15. The method of any of claim 13, further comprising:
controlling receiving, by the base station from the user equipment, a random access procedure information availability indicator that indicates that the user equipment has logged the random access procedure information;
wherein the controlling sending comprises controlling sending, by the base station, the information request in response to the random access procedure information availability indicator.

16. The method of claim 13, further comprising:
determining, by the base station based on at least one of the random access procedure report received from the user equipment or the base-station communicated random access procedure information, cost information including a random access procedure cost for each of one or more of the random access procedure trigger types;
adjusting, by the base station based on the cost information, one or more random access procedure parameters or allocation of resources, for at least one of the plurality of random access procedure trigger types.

17. An apparatus comprising:
at least one processor; and
at least one memory including computer program code;
the at least one memory and the computer program code configured to, with the at least one processor, cause the apparatus at least to
control sending, by a base station to a user equipment, an information request for random access procedure information for one or more random access procedures of the user equipment, the information request including an indication of one or more random access procedure trigger types for which random access procedure information is being requested; and
control receiving, by the base station from the user equipment, a random access procedure report including the random access procedure information for the one or more indicated random access procedure trigger types.

18. The method of claim 17, wherein the information request comprises a bitmap that indicates one or more random access procedure trigger types for which random access procedure information is being requested.

19. The method of any of claim 17, further comprising:
control receiving, by the base station from the user equipment, a random access procedure information availability indicator that indicates that the user equipment has logged the random access procedure information;
wherein the controlling sending comprises controlling sending, by the base station, the information request in response to the random access procedure information availability indicator.

* * * * *